US 11,809,142 B2

(12) United States Patent
Thomas et al.

(10) Patent No.: US 11,809,142 B2
(45) Date of Patent: *Nov. 7, 2023

(54) METHOD AND APPARATUS FOR RELIABLY TRANSFERRING SIGNALS BETWEEN ELECTRONIC COMPONENTS

(71) Applicant: Google LLC, Mountain View, CA (US)

(72) Inventors: Marc Thomas, Mokelumne Hill, CA (US); Jacob Stelman, Ventura, CA (US)

(73) Assignee: Google LLC, Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/403,293

(22) Filed: Aug. 16, 2021

(65) Prior Publication Data

US 2021/0373506 A1 Dec. 2, 2021

Related U.S. Application Data

(63) Continuation of application No. 16/140,679, filed on Sep. 25, 2018, now Pat. No. 11,092,933.

(51) Int. Cl.
*G04G 17/06* (2006.01)
*G04G 17/08* (2006.01)
*G06F 1/16* (2006.01)

(52) U.S. Cl.
CPC ............ *G04G 17/06* (2013.01); *G04G 17/08* (2013.01); *G06F 1/1681* (2013.01)

(58) Field of Classification Search
CPC ...... G04G 17/06; G04G 17/08; G06F 1/1681; H01R 39/64; H01R 35/04; H01R 2201/16;

(Continued)

(56) References Cited

U.S. PATENT DOCUMENTS 3,973,706 A * 8/1976 Boyce ................. H01M 50/216
368/204
4,323,996 A * 4/1982 Ganter .................. G04C 3/008
968/452

(Continued)

FOREIGN PATENT DOCUMENTS

CN 1722546 A 1/2006
CN 203422572 U 2/2014

(Continued)

OTHER PUBLICATIONS

Office Action for Korean Patent Application No. 10-2023-7001779 dated Jan. 30, 2023. 7 pages.

(Continued)

*Primary Examiner* — Edwin A. Leon
(74) *Attorney, Agent, or Firm* — Lerner David LLP

(57) ABSTRACT

An electronic hinge system is provided, including a first component and a second component. The first component may include a first enclosure, a first substrate extending within the first enclosure, a first connector, and a plurality of curved elements disposed in the first connector. The first substrate may have electrically conductive elements and microelectronic devices electrically connected with the electrically conductive elements. The curved elements may be electrically conductive and spaced apart from one another. Each curved element may be electrically connected with a respective one of the electrically conductive elements of the first component. The second component may include a second enclosure and a second connector disposed at an end of the second enclosure. The first connector may be configured to mate with the second connector, such that when the first component is engaged with the second component, the first connector is rotationally coupled with the second connector.

17 Claims, 18 Drawing Sheets

(58) Field of Classification Search
CPC .. H01R 24/58; H01R 13/508; H01R 33/7635; H01R 2201/26; H01R 2107/00
See application file for complete search history.

(56) References Cited

U.S. PATENT DOCUMENTS

| | | | |
|---|---|---|---|
| 5,395,248 | A | 3/1995 | Kinoshita et al. |
| 5,526,006 | A * | 6/1996 | Akahane ........... B29C 45/14311 343/866 |
| 5,732,331 | A | 3/1998 | Harms |
| 6,083,010 | A | 7/2000 | Daoud |
| 6,280,258 | B1 | 8/2001 | Frohlund |
| 6,350,055 | B1 | 2/2002 | Barras |
| 6,535,376 | B2 * | 3/2003 | Fujita ..................... H04R 1/028 343/718 |
| 8,753,129 | B2 | 6/2014 | Worley |
| 9,367,087 | B1 | 6/2016 | Townsend et al. |
| 11,006,704 | B2 | 5/2021 | Nicolas et al. |
| 11,092,933 | B2 * | 8/2021 | Thomas ................. G04G 17/06 |
| 2004/0074045 | A1 | 4/2004 | Winstead et al. |
| 2014/0362544 | A1 | 12/2014 | Han et al. |
| 2016/0363957 | A1 | 12/2016 | Stroetmann |
| 2017/0264037 | A1 | 9/2017 | Tulloch et al. |

FOREIGN PATENT DOCUMENTS

| | | |
|---|---|---|
| CN | 103797659 A | 5/2014 |
| CN | 104243637 A | 12/2014 |
| CN | 205334075 U | 6/2016 |
| CN | 205671641 U | 11/2016 |
| CN | 206209494 U | 5/2017 |
| CN | 108021020 A | 5/2018 |
| CN | 108594629 A | 9/2018 |
| EP | 2813907 A2 | 12/2014 |
| JP | H04133391 U | 12/1992 |
| JP | H06005171 U | 1/1994 |
| JP | 2002221217 A | 8/2002 |
| JP | 2003045597 A | 2/2003 |
| JP | 2005527083 A | 9/2005 |
| JP | 2007055539 A | 3/2007 |
| KR | 20000048238 A | 7/2000 |
| KR | 20180084912 A | 7/2018 |
| WO | 2011137865 A2 | 11/2011 |

OTHER PUBLICATIONS

Invitation to pay additional fees and Partial International Search report for Application No. PCT/US2019/048140 dated Nov. 13, 2019, 80 pp.
International Search Report including Written Opinion for Application No. PCT/US2019/048140, dated Jan. 15, 2020, pp. 1-19.
International Preliminary Report on Patentability for International Application No. PCT/US2019/048140 dated Apr. 8, 2021. 12 pages.
Office Action for European Patent Application No. 19765875.0 dated Jun. 29, 2021. 7 pages.
Notice of Allowance for Japanese Patent Application No. 2020-565875 dated Aug. 17, 2021. 3 pages.
Notification of the First Office Action for Chinese Patent Application No. 201980051960.1 dated Aug. 4, 2021. 11 pages.
First Examination Report for Indian Patent Application No. 202047044881 dated Dec. 3, 2021. 7 pages.
Notice of Allowance for Korean Patent Application No. 10-2020-7033246 dated Oct. 25, 2022. 3 pages.
Extended European Search Report for European Patent Application No. 22208578.9 dated Jul. 20, 2023. 16 pages.

* cited by examiner

METHOD AND APPARATUS FOR RELIABLY TRANSFERRING SIGNALS BETWEEN ELECTRONIC COMPONENTS

CROSS-REFERENCE TO RELATED APPLICATIONS

The present application is a continuation of U.S. patent application Ser. No. 16/140,679, filed Sep. 25, 2018, the disclosure of which is incorporated herein by reference.

BACKGROUND

Conventional electronic watches and activity modules do not transfer signals to or from a watch band. However, the electronic watch industry is moving towards advanced bio-sensing, which may necessitate that additional sensors, batteries, and/or cameras be placed in the watch band, which would require an electronic connection between the watch band and the electronic watch or activity module.

BRIEF SUMMARY

The present disclosure provides for electronic watch systems and electronic hinge systems that can reliably transfer signals between a first component (e.g., a watch band) and a second component (e.g., an electronic watch) without using additional energy, through a rotational coupling between the first component and the second component.

One aspect of the disclosure provides an electronic hinge system including a first component and a second component. The first component may include a first enclosure, a first substrate extending within the first enclosure, a first connector disposed at an end of the first enclosure, and a plurality of curved elements disposed in the first connector. The first substrate may have electrically conductive elements and one or more microelectronic devices electrically connected with the electrically conductive elements. The first connector may have a longitudinal opening extending in a first direction through the first connector. The first connector may have a plurality of first openings extending into the first connector in a second direction transverse to the first direction and spaced apart from one another in the first direction. The curved elements may be electrically conductive and spaced apart from one another in the first direction. Each curved element may have an inner surface at least partially extending around the longitudinal opening and an outer surface opposite the inner surface. A curved portion of the outer surface of each curved element may be exposed at a respective one of the plurality of first openings. Each curved element may be electrically connected with at least a respective one of the electrically conductive elements of the first component. The second component may include a second enclosure and a second connector disposed at an end of the second enclosure. The first connector may be configured to mate with the second connector, such that when the first component is engaged with the second component, the first connector is rotationally coupled with the second connector.

Another aspect of the disclosure provides an electronic watch system including an electronic watch band, a receptacle rotationally coupled with the electronic watch band, and an electronic watch. The electronic watch band may include a first flexible enclosure having a first flexible substrate extending within the first enclosure, and a first connector disposed at an end of the first enclosure and having a plurality of curved elements disposed in the first connector. The first substrate may have electrically conductive elements and one or more microelectronic devices electrically connected with the electrically conductive elements. The curved elements may be electrically conductive and spaced apart from one another. Each curved element may be electrically connected with at least a respective one of the electrically conductive elements of the first substrate. The receptacle may include a circular ledge and an intermediate connector disposed within the circular ledge and having a plurality of contacts disposed therein. The contacts may be electrically conductive and spaced apart from one another in a circumferential direction. Each contact may have a first end exposed at a bottom surface of the circular ledge and a second end exposed at a top surface of the circular ledge opposite the bottom surface. The first ends of the contacts may be engaged with and electrically connected with the plurality of curved elements.

The electronic watch may include a second enclosure having a second substrate extending within the second enclosure, and a second connector disposed at a surface of the second enclosure and having a plurality of pins disposed in the second connector. The second substrate may have electrically conductive elements and one or more microelectronic devices electrically connected with the electrically conductive elements. The pins may be electrically conductive and spaced apart from one another in the circumferential direction. Each pin may have a free end exposed at a bottom surface of the second enclosure. Each pin may be electrically connected with at least a respective one of the electrically conductive elements of the second substrate. The plurality of pins may be configured to mate with the plurality of contacts, such that when the electronic watch is engaged with the receptacle, the free ends of the pins are engaged with and electrically connected with the second ends of the contacts.

Yet another aspect of the disclosure provides an electronic watch band including a flexible enclosure, a flexible substrate extending within the flexible enclosure, a connector disposed at an end of the flexible enclosure, and a plurality of curved elements disposed in the connector. The flexible substrate may have electrically conductive elements and one or more microelectronic devices electrically connected with the electrically conductive elements. The connector may have a longitudinal opening extending in a first direction through the connector. The connector may have a plurality of transverse openings extending into the connector in a second direction transverse to the first direction and spaced apart from one another in the first direction. The curved elements may be electrically conductive and spaced apart from one another in the first direction. Each curved element may have an inner surface extending at least partially around the longitudinal opening and an outer surface opposite the inner surface. A curved portion of the outer surface of each curved element may be exposed at a respective one of the plurality of openings. Each curved element may be electrically connected with at least a respective one of the electrically conductive elements.

DETAILED DESCRIPTION

Overview

Figure 1A:
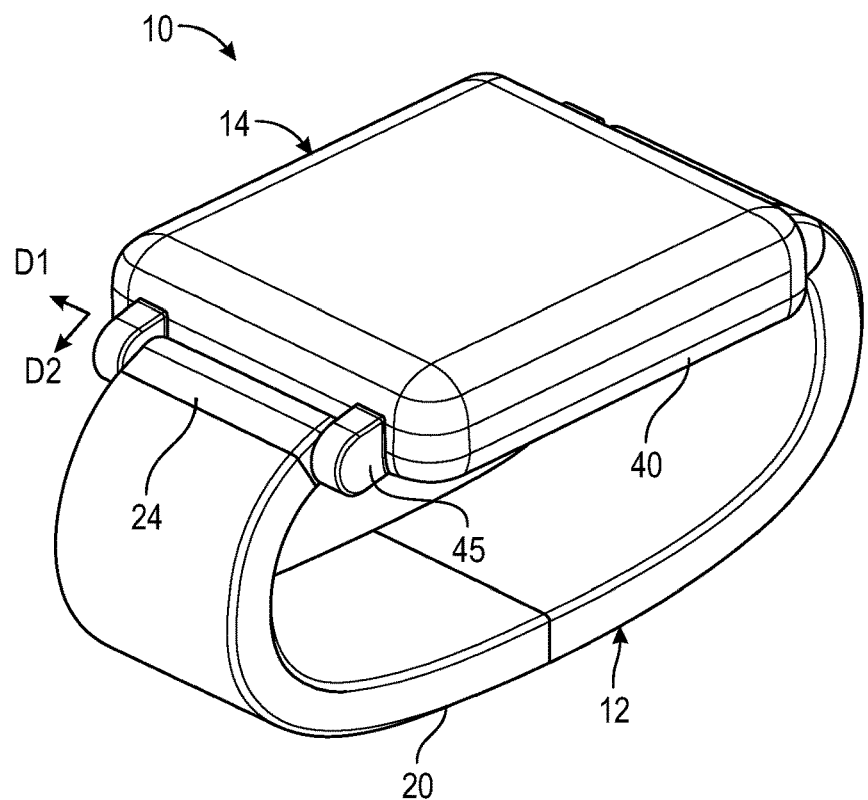
FIG. 1A illustrates a perspective view of an electronic watch system according to an aspect of the disclosure.
Figure 1B:
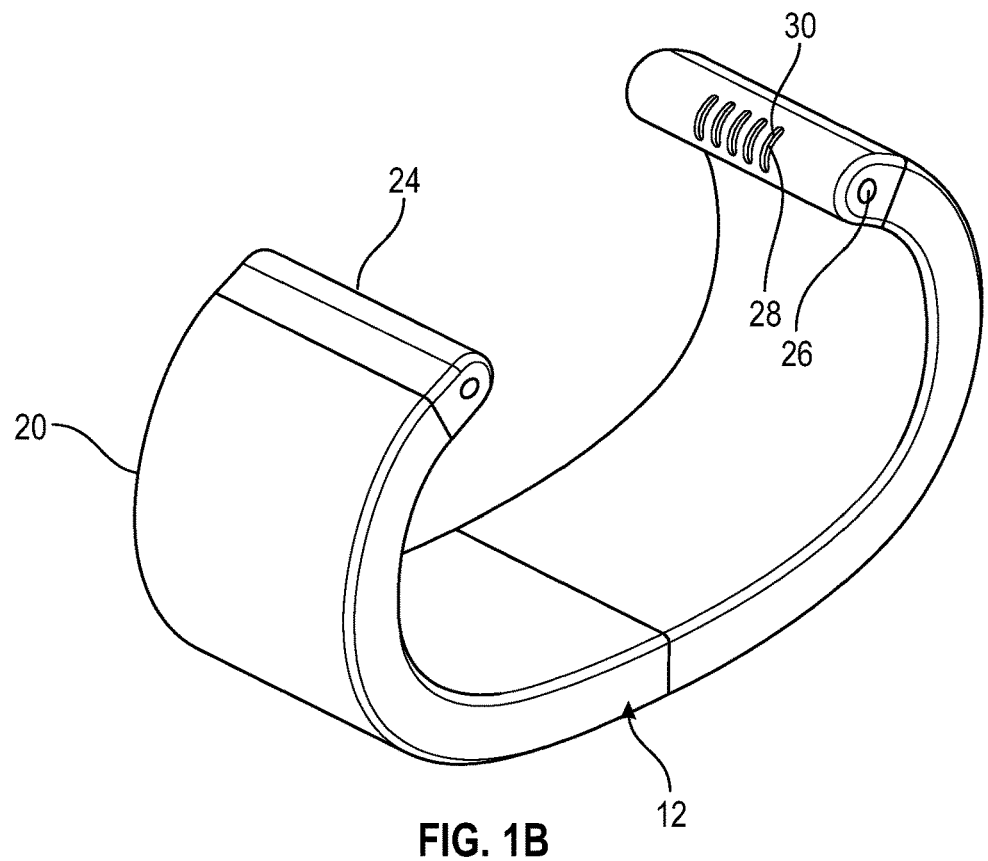
FIG. 1B is another perspective view of the watch band of FIG. 1A.
Figure 1C:
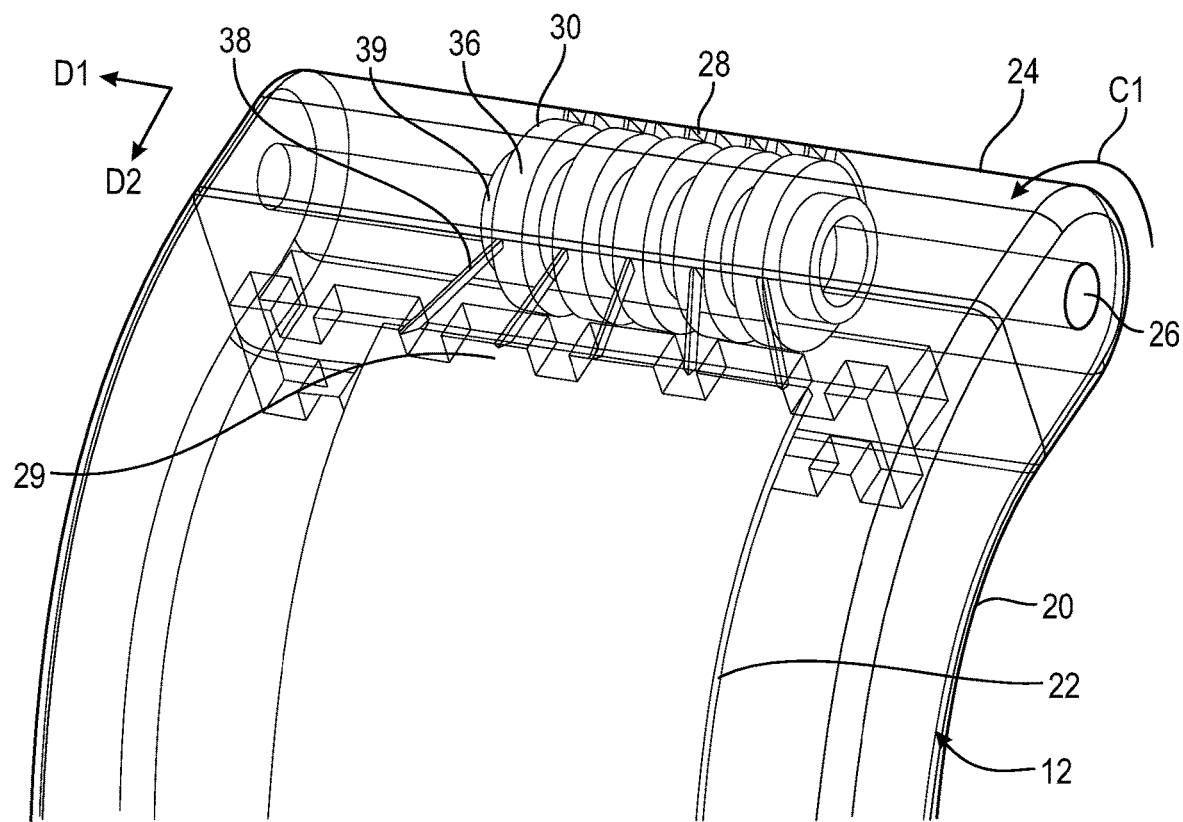
FIG. 1C is an enlarged, partially-transparent perspective view of a connector of the watch band of FIG. 1A.

The technology relates generally to an electronic hinge mechanism configured to reliably transfer signals between a watch and a band, between a keyboard and a screen, or between movable components of other devices. In particular, the mechanism provides a rotatable electrical connection between a first component and a second component. The mechanism includes a plurality of rings in the first component that mate with a plurality of electrically conductive contacts in the second component. Electrical connections between the rings and contacts may be maintained during rotation because ends of the contacts can slide along respective outer circumferential surfaces of the rings as the rings rotate relative to the contacts.

In some implementations, the first component may be a watch band and the second component may be a smart watch. The first component may include a connector having a row of electrically conductive rings spaced apart from one another. The rings extend around a single opening that is configured to receive a conventional pin that may be used to couple the watch band to a connector of a smart watch. The second component may include a connector having a row of electrically conductive contacts spaced apart from one another. The contacts are configured to mate with the rings when the watch band is coupled to the smart watch. The electrical connections between the contacts and the rings are maintained as the watch band rotates relative to the smart watch during typical movement by a user.

In the watch band and smart watch implementation described above, the row of electrically conductive contacts may include various types of connections between the row of rings and one or two printed circuit boards (PCBs). For example, a contact may extend between one of the rings and only the first PCB, either by shortening an end of the contact or by not providing a conductive pad at the location at which the end of the contact touches the second PCB. In another example, a contact may extend between the first PCB and the second PCB, but it may be shortened so that it does not extend to any of the rings. In a particular implementation, a row of identical contacts may be used, or one or more of the contact variations described above may be combined in a single smart watch connector. In this regard, the PCBs may programmatically select one or more contacts for any given communication.

The watch band may be coupled to various types of watches. In one example, the smart watch band may be coupled to a conventional analog watch while enabling smart watch features. For example, the smart band may not be electrically connected with the analog watch, but the band can communicate with a smart phone, which serves as a display and interface for smart features. In another example, the smart watch band may be coupled to a smart watch, which permits various components and/or functions to be distributed between the band and the watch, such as auxiliary power, camera, or activity-specific functions. The smart watch band may also be coupled to a smart module that does not have a display screen. In such an implementation, the band can separate and/or share functions with the smart module, but a smart phone may be used as the display and interface. In one implementation, the ring-contact rotational coupling described above may be integrated into one or more hinges to permit signals to be sent from a laptop keyboard to a laptop screen.

In some examples, such as another smart watch implementation, the ring-contact coupling may be included in a non-rotational coupling between the first component and the second component. In such an implementation, interlocking features may be included that prevent relative rotation between the first and second components while better sealing the electrical connections therebetween. For example, the smart band may have a connector that includes tabs that are configured to engage with recesses in a smart watch, the tabs and recesses both having rectangular cross-sections to prevent relative rotation. The smart band and the smart watch may each have a continuous lip extending around the exposed portions of the rings and contacts, the lip of the smart band being engageable into the lip of the smart watch. A gasket may extend around the inside of the lip of the smart watch, such that a water-tight seal is created when the lip of the smart band engages with the lip of the smart watch.

In one implementation, the ring-contact coupling may be included in a smart watch having a receptacle mount, such as a bayonet mount for example. In such an implementation, the connector of the smart band may include a row of electrically conductive rings as described above. The contacts described above may be included in a circular receptacle that is rotationally coupled with the watch band, using a spring-loaded watch band pin extending through the row of rings, for example. A smart watch having a row of electrically conductive pins may be rotationally engaged into the circular receptacle, such that when the smart watch is fully engaged into the receptacle, the pins are rotated into contact with the contacts of the receptacle. The pins and the contacts may be unevenly spaced apart from one another, such that during rotation of the smart watch into engagement with the circular receptacle, there is only a single electrical connection between the pins and the contacts at any time before the smart watch is fully engaged into the receptacle.

The electronic hinge mechanism described above may have various benefits and advantages. The mechanism requires no energy to effect communication between components of an electronic device, such as a watch. Moreover, the mechanism is low cost, easily detachable and connectable, insensitive to dirt, and provides for a wide range of movement between the components of the electronic device. Even further, the mechanism enables PCBs to be capable of programmatically switching between different connectors. The same rotatable ring-contact portion of the mechanism is able to be incorporated into various designs of smart watches, smart wearable modules, analog watches, and laptop hinges.

Example Systems

Referring to FIGS. 1A-1F, an example electronic watch system 10 includes an electronic watch band 12 engaged with an electronic watch 14, such as a smart watch.

The Electronic Watch Band

The electronic watch band 12 includes an enclosure 20 that is configured to fit around a wrist of a user. The enclosure 20 may be made of a flexible material, such as an elastomer. The watch band 12 also includes a substrate 22 extending within the enclosure 20. The substrate 22 may be flexible, such that it is configured to bend around the wrist of a user when the enclosure 20 is bent around the wrist of the user. The substrate 22 may have electrically conductive elements and one or more microelectronic devices electrically connected with the electrically conductive elements, such as one or more of sensors, batteries, or cameras. The watch band 12 may have one or more substrates 22 therein, each of which may include one or more microelectronic devices.

The watch band 12 may include a connector 24 disposed at each end of the enclosure 20. Each connector 24 may be made of a rigid material such as polyethylene terephthalate (PET). Each connector 24 may be attached to an end of the enclosure 20 and may have a portion defining a rounded or semi-circular cross-section. Each connector 24 may have a longitudinal opening 26 extending in a first direction D1 through the connector. The rounded portion of the outer surface of each connector 24 may extend in a circumferential direction C1 partially about the longitudinal opening 26. Each connector 24 may have a plurality of transverse openings 28 extending into the rounded portion of the connector in a second direction D2 transverse to the first direction D1 and spaced apart from one another in the first direction.

Each connector 24 includes a plurality of rings 30 disposed in the connector. As shown in the figures, there are five rings 30, but in other examples, there may be more or less than five rings. The rings 30 may be electrically conductive and spaced apart from one another in the first direction D1. As shown in the figures, the rings 30 are spaced apart from one another in the first direction D1 by equal distances, but in other examples, the distance between adjacent rings may vary within a single connector 24. In other examples, the number, size, and relative position of the rings 30 may be varied. The rings 30 may each be a gold-plated metal or another electrically conductive material. As can be seen in FIG. 1F, each ring 30 may have a lumen 32 defining an inner surface 34 extending around the longitudinal opening 26 and an outer surface 36 opposite the inner surface. A curved portion 33 of the outer surface 36 of each ring 30 is exposed at a respective one of the plurality of transverse openings 28.

Each ring 30 may be electrically connected with at least one of the electrically conductive elements of the substrate 22 through one or more electrically conductive wires 38. The wires 38 may extend from the rings 30 to the substrate 22 through openings 29 that extend between the connector 24 and the enclosure 20. Each connector may include one or more spacers 39 extending around the longitudinal opening 26 and extending through the lumens 32 of the rings 30. In some examples, the spacer 39 may also extend between adjacent ones of the rings 30. As can be seen in FIG. 1E, the spacer 39 may have a cylindrical shape. The spacer 39 may be configured to electrically insulate the rings 30 from one another and from the longitudinal opening 26.

The Electronic Watch

Figure 1D:
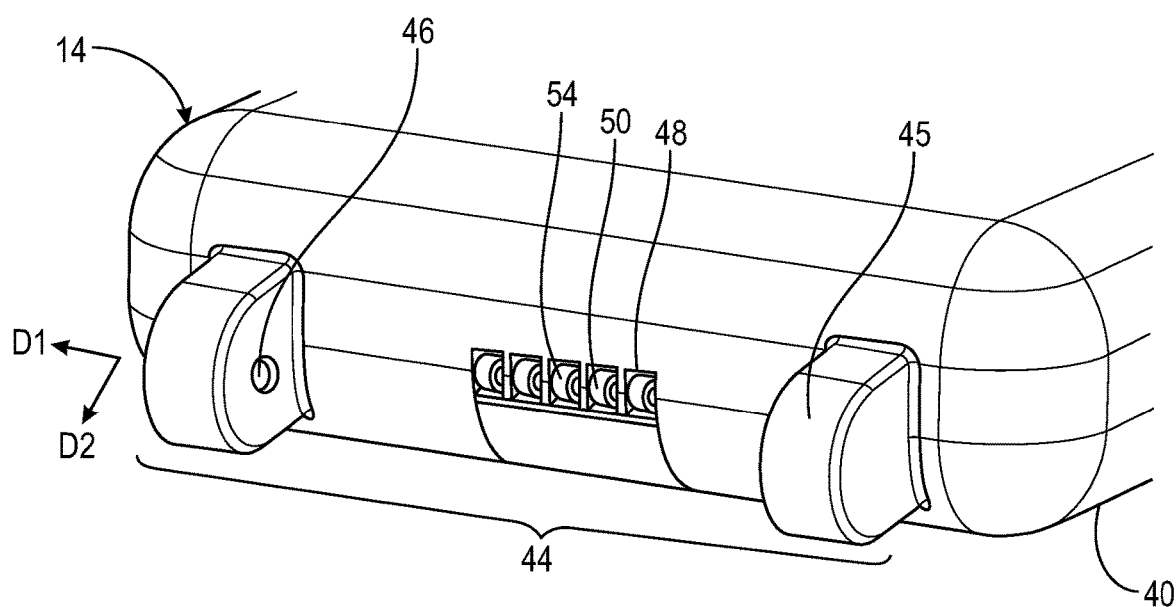
FIG. 1D is a perspective view of a connector of the electronic watch of FIG. 1A.
Figure 1E:
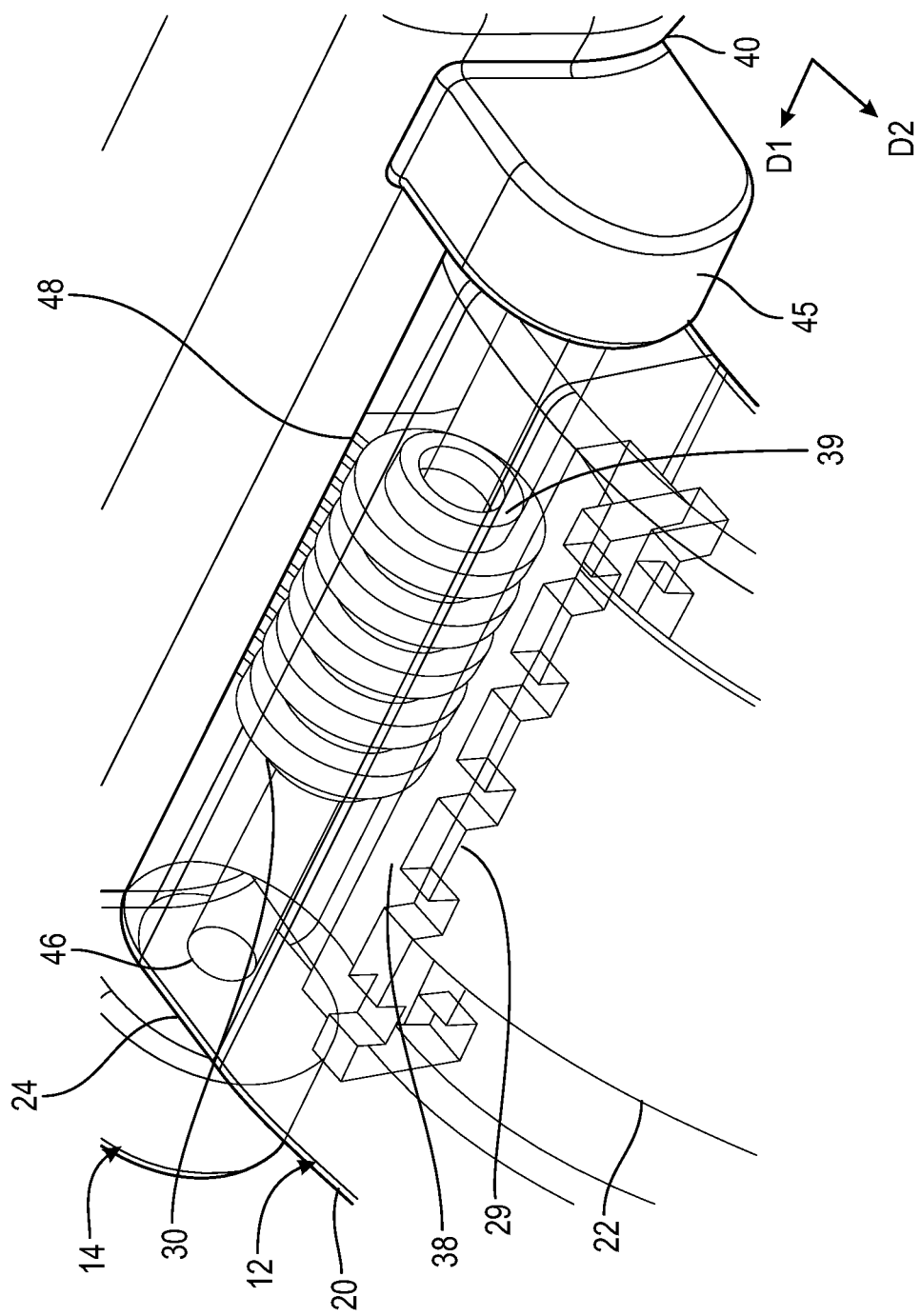
FIG. 1E is an enlarged, partially-transparent perspective view of the coupling between the watch band and the electronic watch of FIG. 1A.
Figure 1F:
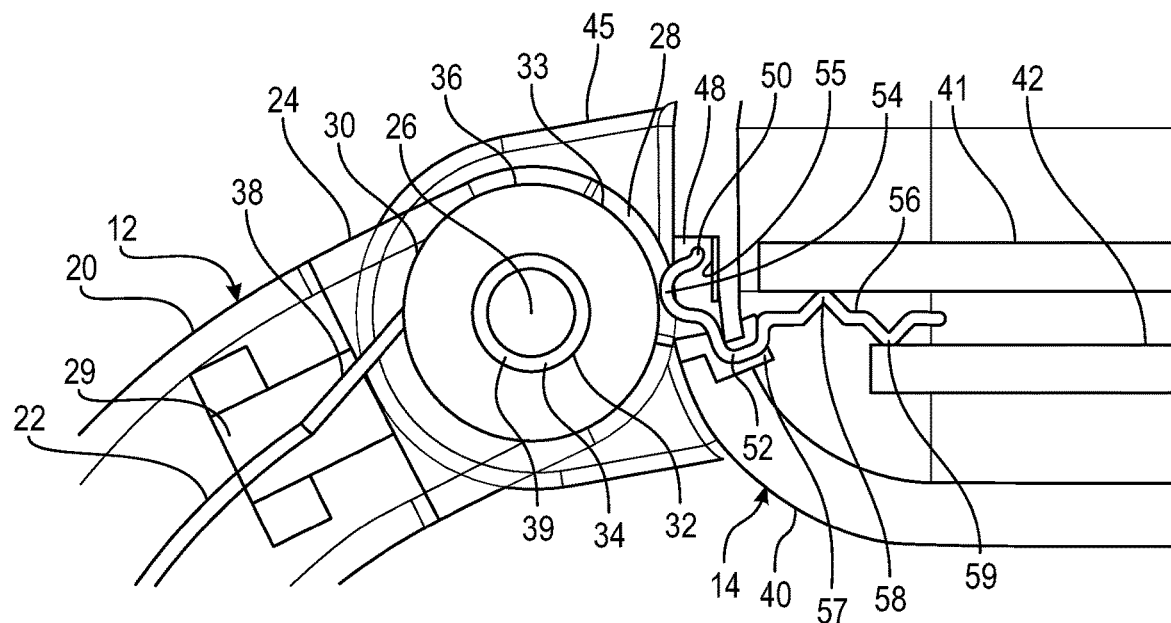
FIG. 1F is a side cross-sectional view of the coupling between the watch band and the electronic watch of FIG. 1A, shown in a first position.

As shown in FIG. 1D, the electronic watch 14 includes an enclosure 40. The electronic watch 14 may include one or more substrates extending within the enclosure 40. For example, as can be seen in FIG. 1F, the substrates may be in the form of two parallel substrates, including an upper printed circuit board ("PCB") 41 and a lower PCB 42 each extending within the enclosure 40. One or both of the upper PCB 41 and the lower PCB 42 may have electrically conductive elements and one or more microelectronic devices electrically connected with the electrically conductive elements, such as a microprocessor and memory. It should be understood that a different number of substrates may be used and the relative positions and sizes of the substrates may be varied.

As can be seen in FIG. 1D, the electronic watch 14 may include a connector 44 disposed at each end of the enclosure 40. Each connector 44 may have, for example, one or more protuberances 45 extending from the enclosure 40 in the second direction D2. In the example shown, each connector 44 has two protuberances 45, although in other examples, the number, size, and position of the protuberances can be varied. Each protuberance 45 may have a recess 46 extending into the protuberance in the first direction D1. The recesses 46 may be spaced apart from one another in the first direction D1. The connector 44 may have a plurality of transverse openings 48 extending into the connector in the second direction D2 and spaced apart from one another in the first direction D1. The transverse openings 48 may extend directly into the enclosure 40.

Each connector 44 includes a plurality of contacts 50 disposed in the connector. As shown in the figures, there are five contacts 50, equal in number to the rings 30, but in other examples, there may be more or less than five contacts. The contacts 50 may be electrically conductive and spaced apart from one another in the first direction D1. As shown in the figures, the contacts 50 are spaced apart from one another in the first direction D1 by equal distances, but in other examples, the distance between adjacent contacts may vary within a single connector 44. In other examples, the number, size, shape, and relative position of the contacts 50 may be varied. Each contact 50 may be a stamped spring metal element having a shape memory, such that the contact is biased to return to its initial shape when a first portion of the contact is bent relative to a second portion of the contact. In other examples, the contacts 50 need not have a shape memory, and the force that maintains the contact between the contacts and the rings 30 may be provided by the enclosure 40 or another component. The contacts 50 may each be a gold-plated metal or another electrically conductive material.

Each contact 50 may have a middle portion 52 that is supported by the enclosure 40, a free end 54 that is cantilevered with respect to the middle portion, and a second end 56 that contacts both the first PCB 41 and the second PCB 42. The middle portion 52 of each contact 50 may extend through an insulating grommet 57 disposed within the respective transverse opening 48. Each insulting grommet 57 may be configured to electrically insulate the contacts from one another and from the enclosure 40. In some examples, such as an example in which the material of the enclosure 40 can electrically insulate the contacts 50 from one another, the insulating grommets 57 may be omitted. The free end 54 of each of the contacts 50 is exposed at a respective one of the plurality of transverse openings 48.

An insulating pad 55 may be provided on a surface of the enclosure 40 that is exposed within each transverse opening 48. Each insulating pad 55 may be configured to electrically insulate the free end 54 of each of the contacts 50 from the enclosure 40 in a circumstance in which the free end is moved into contact with the enclosure. In some examples, such as an example in which the material of the surface of the enclosure 40 that is exposed within each transverse opening 48 is a dielectric material, additional electrical insulation may not be needed, so the insulating pads 55 may be omitted.

At least some of the contacts 50 provide an electrical connection between the electrically conductive elements of the first PCB 41 and the electrically conductive elements of the second PCB 42. As can be seen in FIG. 1F, the second end 56 of each of the contacts 50 may have a first location 58 that contacts an electrically conductive element of the first PCB 41 and a second location 59 that contacts an electrically conductive element of the second PCB 42.

Rotational Coupling Between the Electronic Watch Band and the Electronic Watch

As can be seen in FIG. 1A, the electronic watch band 12 may be engaged with the electronic watch 14. To accomplish this engagement, each connector 24 is configured to mate with a corresponding connector 44, such that when the watch band 12 is engaged with the electronic watch 14, each connector of the watch band is rotationally coupled with a corresponding connector of the electronic watch.

Figure 3A:
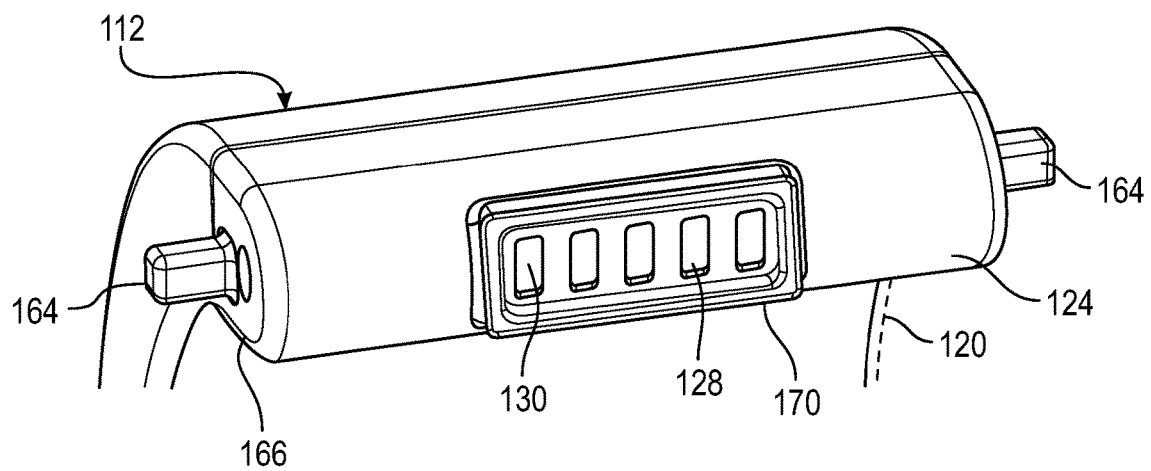
FIG. 3A illustrates an enlarged perspective view of a variation of the connector of the watch band of FIG. 1B, according to an aspect of the disclosure.
Figure 3B:
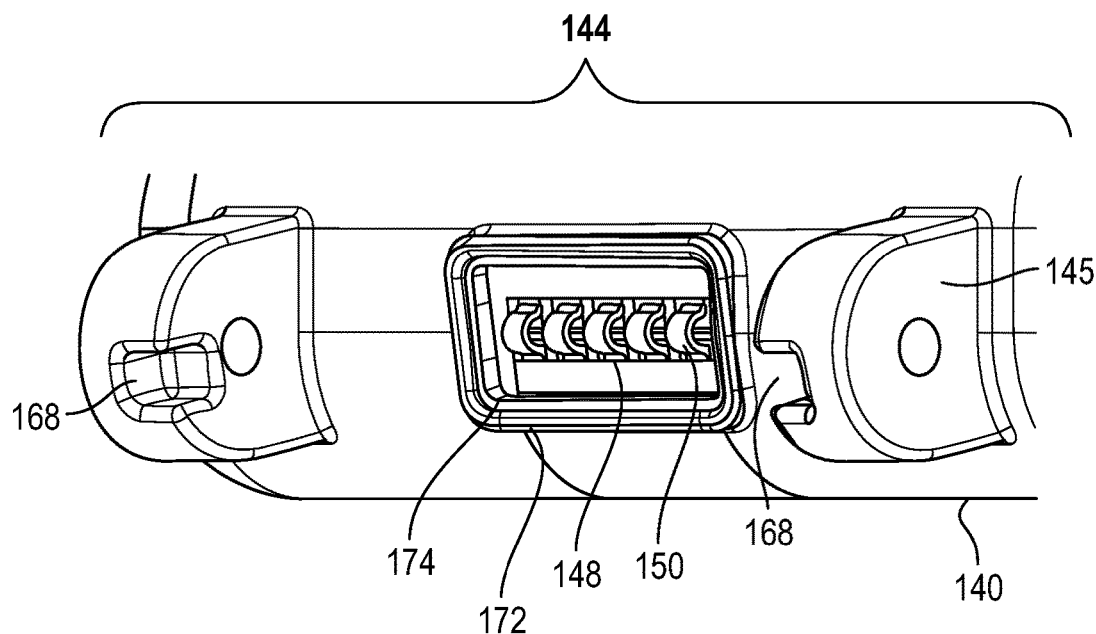
FIG. 3B is an enlarged perspective view of a variation of the connector of the electronic watch of FIG. 1D, according to an aspect of the disclosure.
Figure 3C:
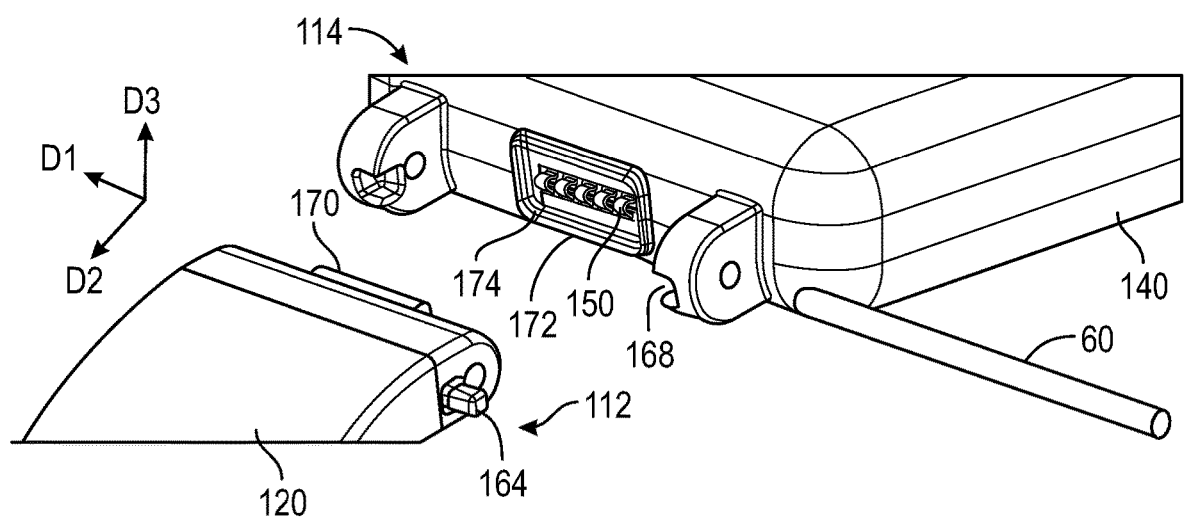
FIG. 3C is an enlarged perspective view of the connector of the watch band of FIG. 3A and the connector of the electronic watch of FIG. 3B.

The rotational coupling of each connector 24 and the corresponding connector 44 may be provided by a cylindrical pin such as the pin 60 shown in FIG. 3C. The cylindrical pin may extend in the first direction D1 into the recess 46 of each of the protuberances 45 of a connector 44 and completely through the longitudinal opening 26 of the corresponding connector 24. Each connector 24 may rotate about the cylindrical pin relative to the enclosure 40. When the cylindrical pin rotationally couples each connector 24 with a corresponding connector 44, each ring 30 will touch a corresponding free end 54 of one of the contacts 50, such that when the electronic watch band 12 is engaged with the electronic watch 14, the rings are electrically connected with the contacts. To this end, the spacing between adjacent ones of the rings 30 should match the spacing between adjacent ones of the contacts 50, whether the spacing between adjacent rings is equal or varying.

Physical and electrical contact between the rings 30 and the contacts 50 may be maintained because of the bias of the shape memory of the contacts. The free end 54 of each of the contacts 50 extends completely through the respective transverse opening 48 and slightly beyond a surface of the enclosure 40, such that when the electronic watch band 12 is engaged with the electronic watch 14, the free ends of the contacts extend into the transverse openings 28 of the connector 24, and there is interference between the free ends of the contacts and the rings 30.

The free end 54 of each of the contacts 50 is configured to deflect towards the enclosure 40 upon contact with a respective one of the rings 30 when the electronic watch band 12 is engaged with the electronic watch 14. When each ring 30 contacts a free end 54 of a contact 50, the cantilevered free end moves relative to the middle portion 52 that is supported by the enclosure 40. Since each free end 54 is biased to return to its initial shape when it is bent relative to the middle portion, the shape memory of the contact 50 provides a force against the corresponding ring 30 that maintains contact between the contact and the ring. While the contacts 50 and their free ends 54 are illustrated as having an example shape, it should be understood that other shapes are possible. For example, the free ends 54 may be straight, angled, curved, looped, etc.

Figure 1G:
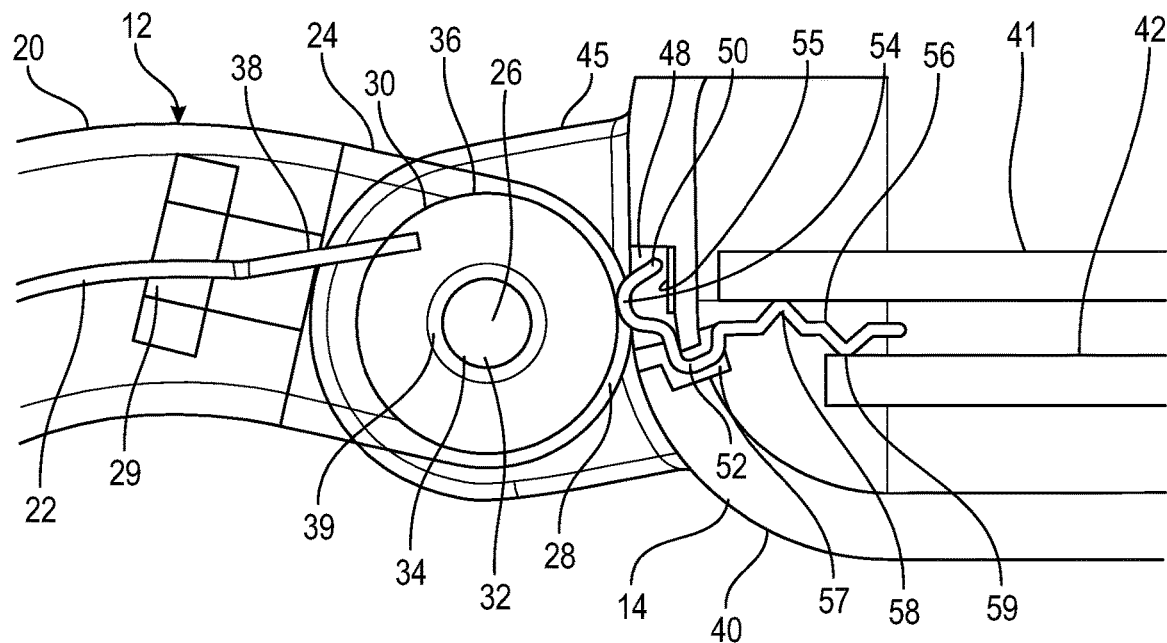
FIG. 1G is another side cross-sectional view of the coupling between the watch band and the electronic watch of FIG. 1A, shown in a second position.

This physical and electrical contact between the rings 30 and the contacts 50 is maintained as each connector 24 rotates relative to the corresponding connector 44, because the free end 54 may slide along the outer surface 36 of the corresponding ring 30 as the connectors rotate relative to one another. For example, the physical and electrical contact between the rings 30 and the contacts 50 is maintained as the electronic watch band 12 moves relative to the electronic watch 14 from a first position shown in FIG. 1F to a second position shown in FIG. 1G. In the first position of FIG. 1F, the substrate 22 is extending downward from the rings 30, and the free ends 54 of the contacts 50 are located near bottom ends of the corresponding transverse openings 28. In the second position of FIG. 1G, the substrate 22 extends horizontally from the rings 30, and the free ends of the contacts 50 are located near top end of the corresponding transverse openings 28. Between the first and second positions, the free ends 54 of the contacts 50 slide along the outer surfaces 36 of the rings 30 in an upward direction within the corresponding transverse openings 28.

Variations of the Rings of the Watch Band

Figure 2A:
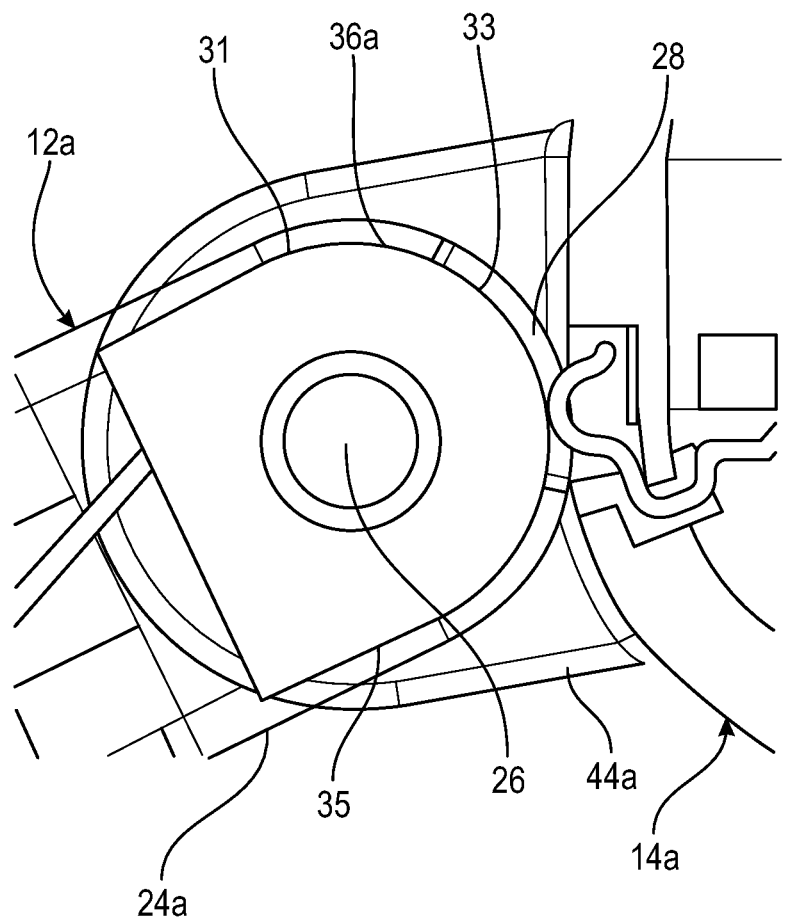
FIG. 2A illustrates a side cross-sectional view of a variation of the rings of FIG. 1F, according to aspects of the disclosure.

FIG. 2A illustrates a variation of the rings 30 of the electronic watch band 12, according to aspects of the disclosure. The rings 30 are shown as having a ring-shaped cross-section throughout the disclosure, but that need not be the case. In the example of FIG. 2A, the electronic watch band 12a has curved elements 31 that replace the rings 30.

The curved elements 31 may each be a gold-plated metal or another electrically conductive material. The curved elements 31 each have a curved portion 33 of its outer surface 36*a* that is exposed at a respective one of the plurality of transverse openings 28 in the watch band. The curved elements 31 may each have a non-exposed portion 35 that may have any shape, such as a portion of a rectangle, as shown in the example of FIG. 2A, or another curved portion similar to the rings 30 of FIGS. 1A-1G. Each of the curved elements 31 in a single connector may have the same cross-sectional shape or a different cross-sectional shape, and the curved elements in one connector of the electronic watch band 12*a* may have different combinations of shapes from another connector of the electronic watch band.

Regardless of the cross-sectional shape of the curved elements 31, the curved elements may extend at least partially around the longitudinal opening 26 so that a pin such as the pin 60 of FIG. 3C may extend through the longitudinal opening to rotationally couple the connector 24*a* of the electronic watch band 12*a* with the connector 44*a* of the electronic watch 14*a*. Variations of the cross-sectional shape of the rings such as the curved elements 31 may be applied to any of the ring examples described herein.

Variations of the Connectors

Figure 2B:
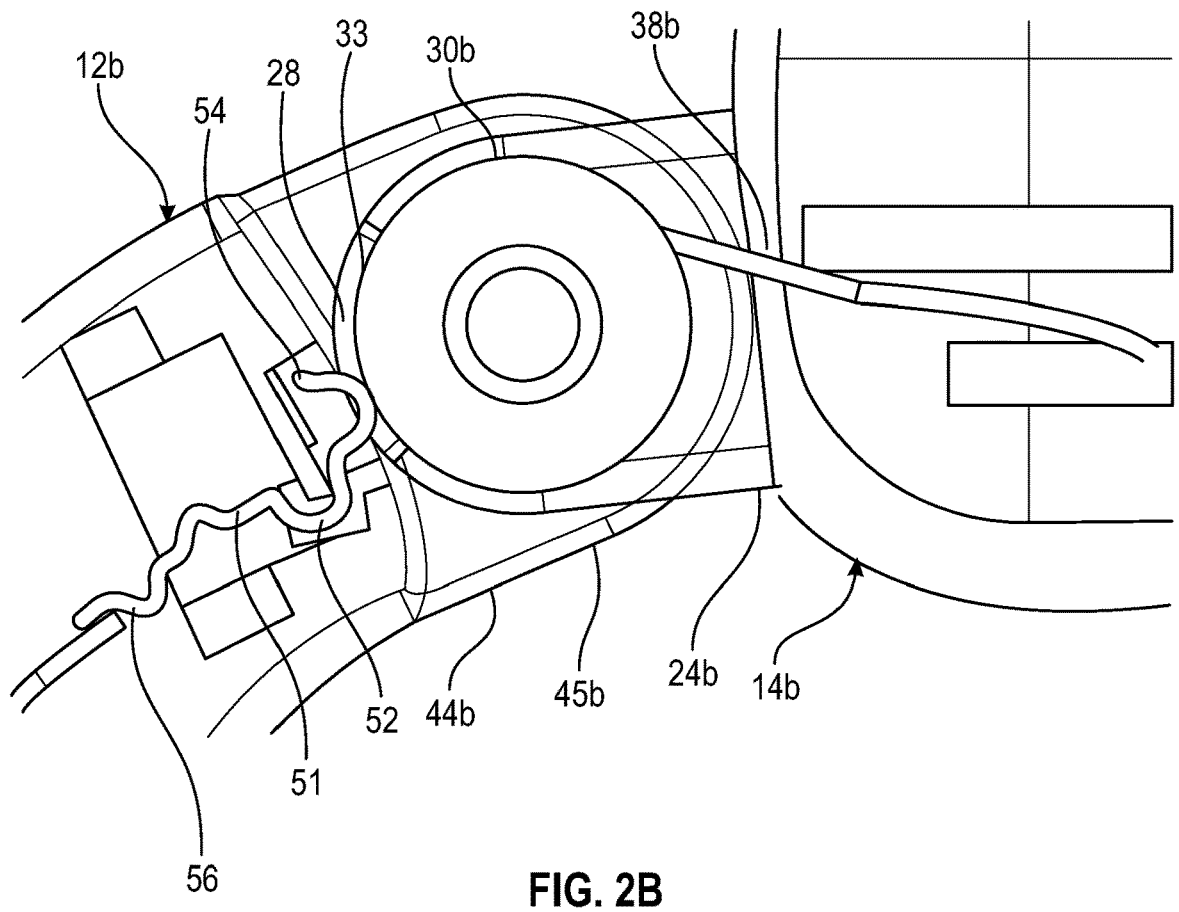
FIG. 2B illustrates a side cross-sectional view of a variation of the connectors of FIG. 1F, according to aspects of the disclosure.

FIG. 2B illustrates a variation of the connectors 24 and 44 of FIGS. 1A-1G, according to aspects of the disclosure. This example is similar to the example shown in FIGS. 1A-1G, except that the ring or curved connector is located in the watch while the spring connector is located in the band. In this example, the electronic watch band 12*b* has a connector 44*b* that is similar to the connector 44 of the electronic watch 14 of FIGS. 1A-1G, and the electronic watch 14*b* has a connector 24*b* that is similar to the connector 24 of the electronic watch band 12 of FIGS. 1A-1G. The connector 44*b* in the band has protuberances 45*b* spaced apart in the first direction D1, and the connector 24*b* in the watch includes rings 30*b* exposed through a plurality of transverse openings 28 at a rounded portion of the connector spaced apart from one another in the first direction. The connector 24*b* has rings 30*b* having rounded portions 33 exposed at respective ones of the transverse openings 28. The rings 30*b* may be electrically connected with one or more PCBs of the electronic watch 14*b* via one or more electrically conductive wires 38*b*.

The connector 44*b* has contacts 51 having free ends 54 that are cantilevered with respect to the middle portion 52, and second ends 56 that may be electrically connected with a substrate of the watch band 12*b*. The contacts 51 may be electrically connected with one or more substrates within the watch band 12*b*, and may have various cross-sectional shapes, such as the shape of the contact 50 of FIGS. 1A-1G, the shape of the contacts 50*a*, 50*b*, or 50*c* that will be described below in FIGS. 2C-2F, or any of a variety of other shapes, such as loops, curves, etc. By way of example only, the free ends 54 of the contacts may be angled, curved, looped, straight, or take any other shape adapted to engage with the ring 30*b* through the transverse opening 28. Each of the contacts 51 in a single connector 44*b* may have the same cross-sectional shape or a different cross-sectional shape, and the contacts in one connector of the electronic watch band 12*b* may have different combinations of shapes from another connector of the electronic watch band.

Variations of the rings or the contacts being located in the electronic watch band or the electronic watch may be applied to any of the examples described herein. In some examples, a single electronic watch band may have a connector 24 at one end and a connector 44*b* at the other end, and a single corresponding electronic watch may have a connector 44 at one end and a connector 24*b* at the other end.

Variations of the Electronic Watch Contacts

Figure 2C:
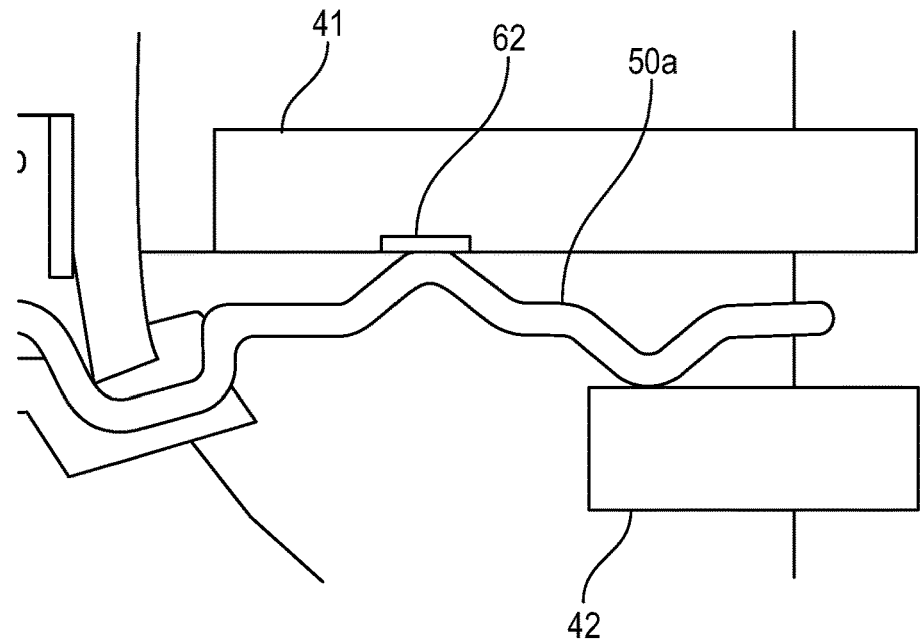
FIGS. 2C-2E illustrate side cross-sectional views of variations of the contact of FIG. 1F, according to aspects of the disclosure.
Figure 2D:
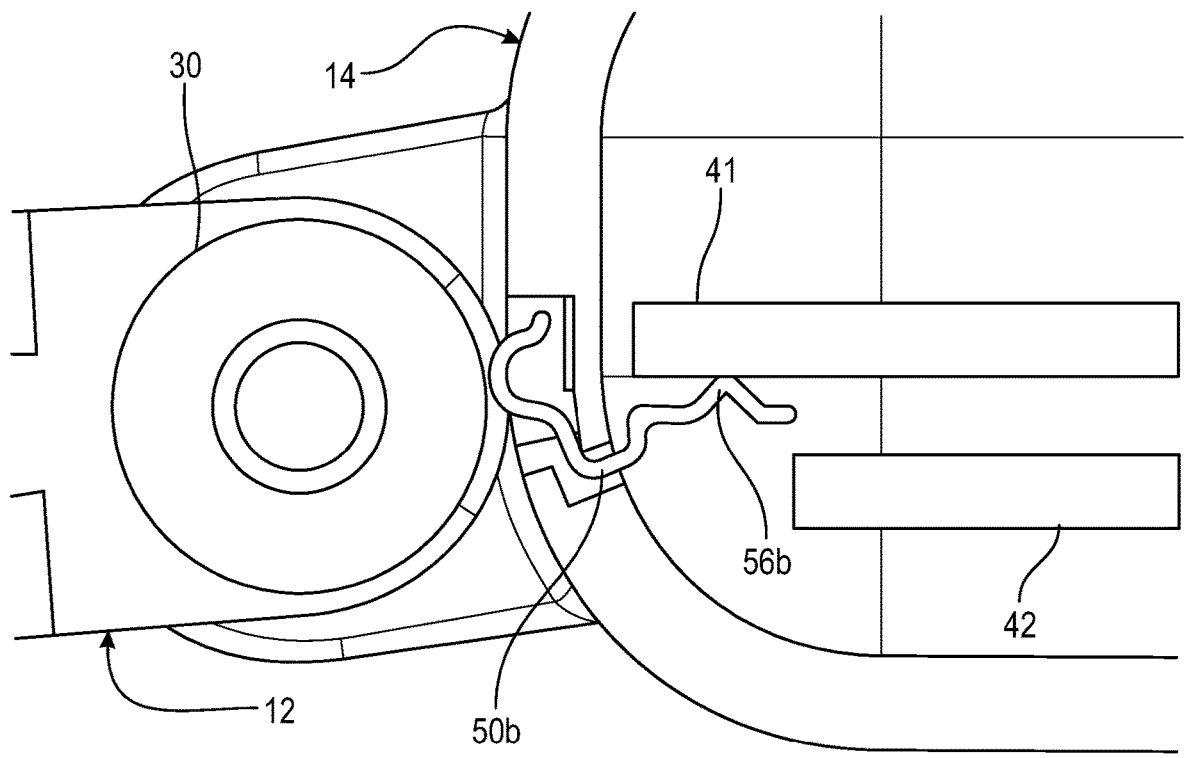
Figure 2E:
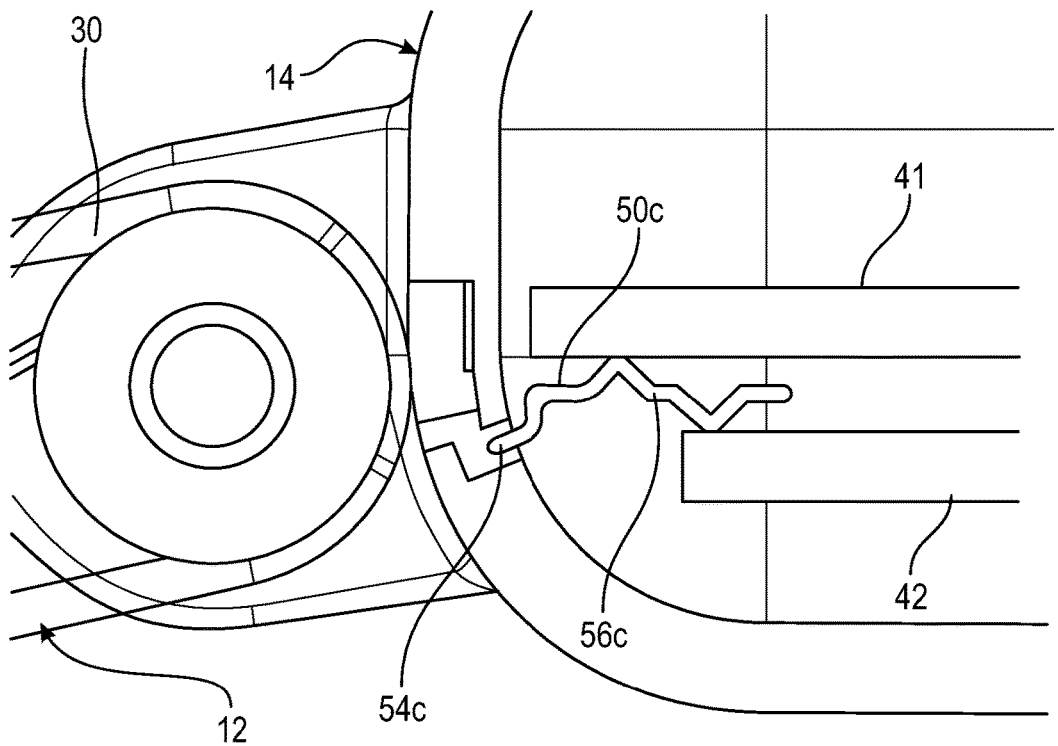

FIGS. 2C-2E illustrate variations of the contacts 50 of the electronic watch 14, according to aspects of the disclosure. FIG. 2C shows a contact 50*a* that is shaped similarly to the contact 50 of FIG. 1F, but it is only electrically connected with the first PCB 41 and not with the second PCB 42. The contact 50*a* touches an electrically conductive pad 62 of the first PCB 41, but at the location where the contact touches the second PCB 42, the second PCB has an electrically insulating feature, such as a portion of a dielectric substrate of the second PCB. Therefore, although the contact 50*a* physically contacts the second PCB 42, the contact is electrically insulated from the electrically conductive elements of the second PCB.

FIG. 2D shows a contact 50*b* that is also shaped similarly to the contact 50, but it has a shorter second end 56*b*. The second end 56*b* of the contact 50*b* is long enough to physically and electrically contact the first PCB 41, but it is not long enough to contact the second PCB 42. Therefore, when the electronic watch band 12 is engaged with the electronic watch 14, and the rings 30 are engaged with corresponding contacts, the contact 50*b* only provides an electrical connection between a corresponding ring and the first PCB 41.

FIG. 2E shows a contact 50*c* that is shaped similarly to the contact 50, but it has a shorter free end 54*c*. The second end 56*c* of the contact 50*c* is long enough to physically and electrically contact the first PCB 41 with the second PCB 42, but the contact is not long enough to touch the corresponding ring 30. Therefore, when the electronic watch band 12 is engaged with the electronic watch 14, the contact 50*c* provides an electrical connection between the first PCB 41 and the second PCB 42, but the contact is spaced apart from the corresponding ring 30, so the contact does not provide an electrical connection between the corresponding ring and the first PCB or second PCB.

Figure 2F:
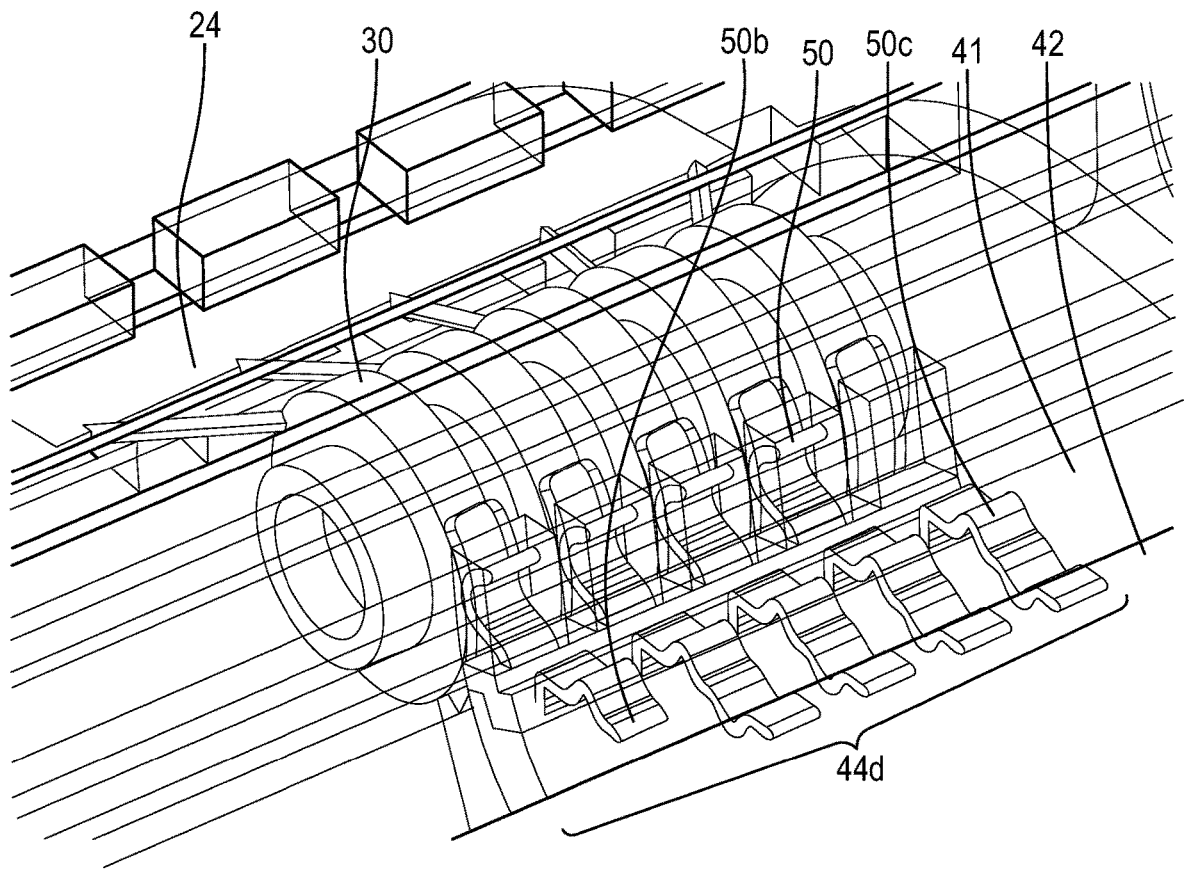
FIG. 2F is an enlarged, partially-transparent perspective view of the contacts shown in FIGS. 1F, 2D, and 2E.

FIG. 2F shows an example of the contacts 50, 50*b*, and 50*c* combined in a single connector 44*d*. When the connector 24 of the electronic watch band is engaged with the connector 44*d* of the electronic watch, the contact 50 is long enough to provide an electrical connection between the corresponding ring 30 and both the first PCB 41 (transparent in FIG. 2F) and the second PCB 42. The contact 50*b* does not reach the second PCB 42, so the contact only provides an electrical connection between the corresponding ring 30 and the first PCB 41. The contact 50*c* does not reach the corresponding ring 30, so the contact only provides an electrical connection between the first PCB 41 and the second PCB 42.

Non-Rotating Connector Variation

Figure 3D:
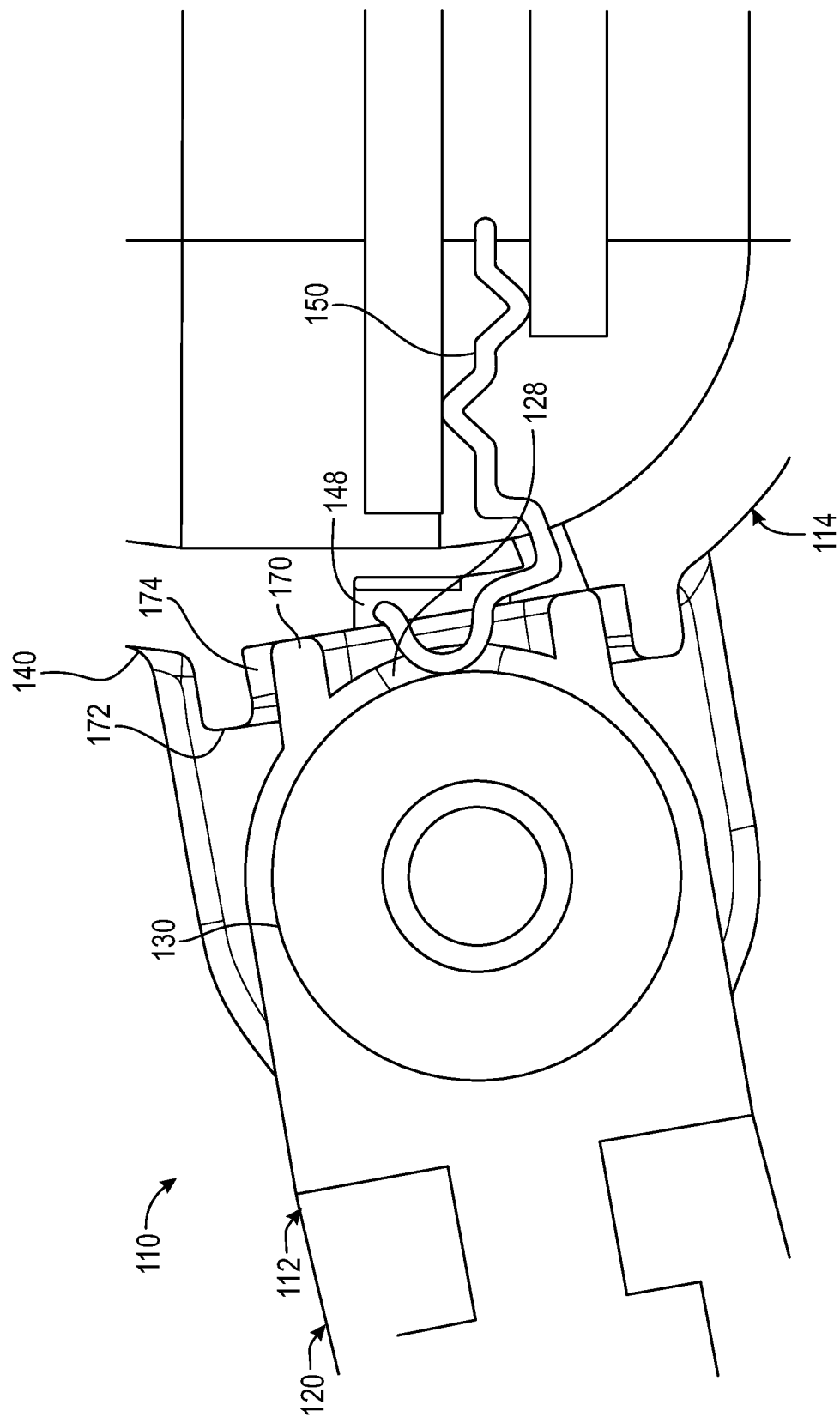
FIG. 3D is a side cross-sectional view of the coupling between the watch band of FIG. 3A and the electronic watch of FIG. 3B.

FIGS. 3A-3D illustrate an example electronic watch system 110 that is a variation of the electronic watch system 10 of FIGS. 1A-1F, according to an aspect of the disclosure. The electronic watch system 110 may be identical to the electronic watch system 10, except for the features described below. As can be seen in FIG. 3D, the electronic watch system 110 includes an electronic watch band 112 engaged with an electronic watch 114.

The watch band 112 includes a connector 124 disposed at each end of an enclosure 120, and the electronic watch 114 includes a connector 144 disposed at each end of an enclosure 140. The connector 124 and the connector 144 are identical to the connectors 24 and 44 described above, but with the addition of interlocking features that are configured to mate with one another when the watch band 112 is engaged with the electronic watch 114, the interlocking features being configured to prevent rotation of the connectors relative to one another.

The interlocking features include two tabs 164 extending from lateral surfaces 166 of the connector 124 in the first direction D1, and two recesses 168 extending into respective protuberances 145 of the connector 144 in both the first and second directions D1 and D2. The tabs 164 and the recesses 168 each have a rectangular cross-section, and the height of the tabs in a third direction D3 perpendicular to each of the first and second directions D1 and D2 is approximately equal to or slightly less than the height of the recesses in the third direction, such that the tabs 164 are configured to engage with the recesses 168. The rectangular cross-sections of the tabs 164 and the recesses 168 are configured to rotationally fix the connectors 124 and 144 to one another when the tabs are engaged in the recesses.

The interlocking features also include a lip 170 extending from the connector 124 in the second direction D2 and extending around a plurality of transverse openings 128, a lip 172 extending from the connector 144 in the second direction and extending around a plurality of transverse openings 148, and a gasket 174 extending around an inner surface of the lip 172. The contour of the outer surface of the lip 170 is approximately equal to the contour of the inner surface of the gasket 174, such that when the watch band 112 is engaged with the electronic watch 114, the lip 170 is inserted into the lip 172, and the gasket is configured to provide a water-tight seal between the lips 170 and 172. As can be seen in FIG. 3D, the gasket 174 is thereby also configured to provide a water-tight seal around the interface between rings 130 and contacts 150 when the watch band 112 is engaged with the electronic watch 114.

The interlocking features described above may be varied from the particular example shown in FIGS. 3A-3D. For example, tabs may be provided on the protuberances 145 of the connector 144, and complimentary recesses may be provided extending into the connector 124. Also, the gasket 174 may be provided extending around an outer surface of the lip 170. In another variation, the contours of the lips 170 and 172 may be reversed and the gasket 174 may be provided extending around an inner surface of the lip 170, such that the contour of the outer surface of the lip 172 is approximately equal to the contour of the inner surface of the gasket 174, and the lip 172 is inserted into the lip 170 when the watch band 112 is engaged with the electronic watch 114.

Receptacle Mounting Variation

Figure 4A:
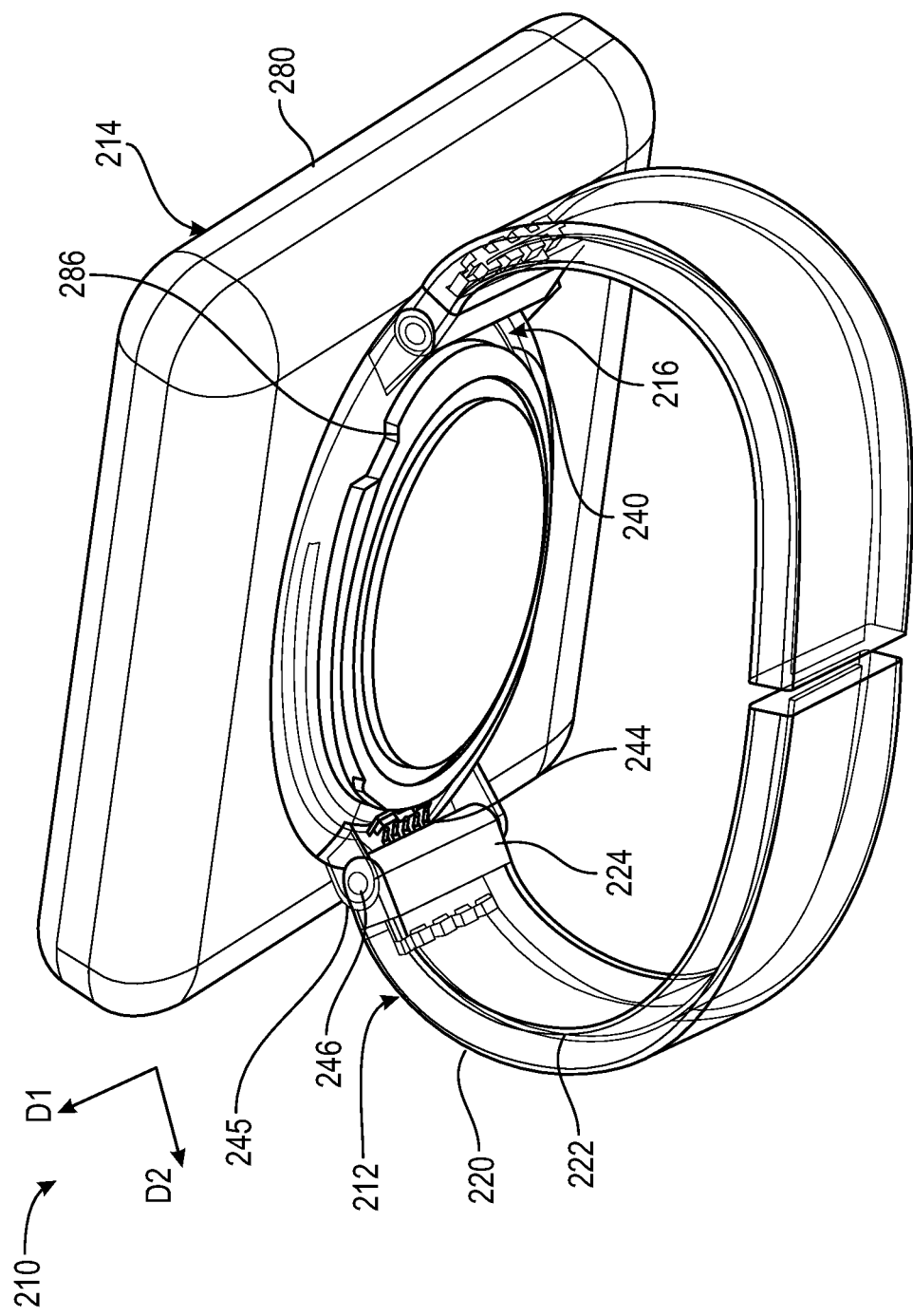
FIG. 4A illustrates a perspective view of an electronic watch system according to an aspect of the disclosure.
Figure 4B:
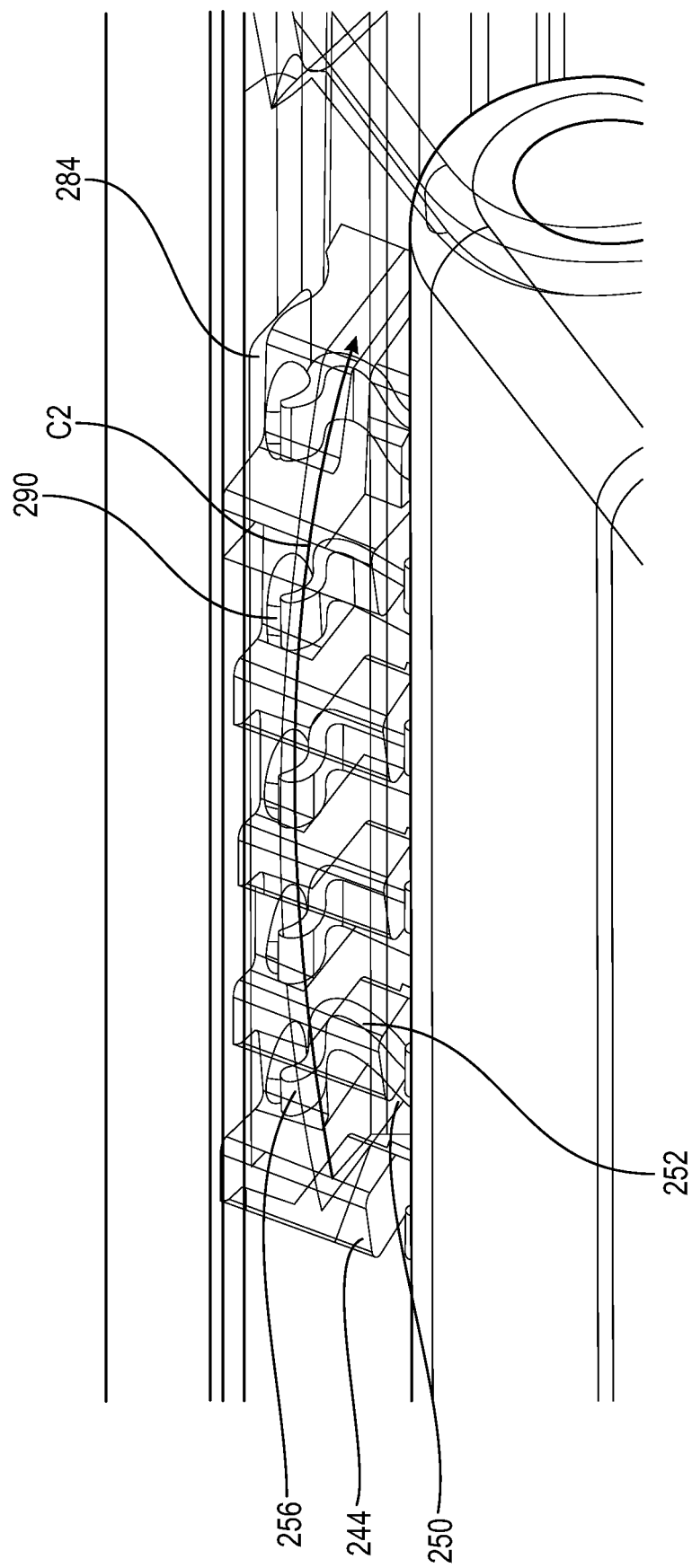
FIG. 4B is an enlarged, partially-transparent perspective view of the coupling between the watch band, a receptacle, and the electronic watch of FIG. 4A.
Figure 4C:
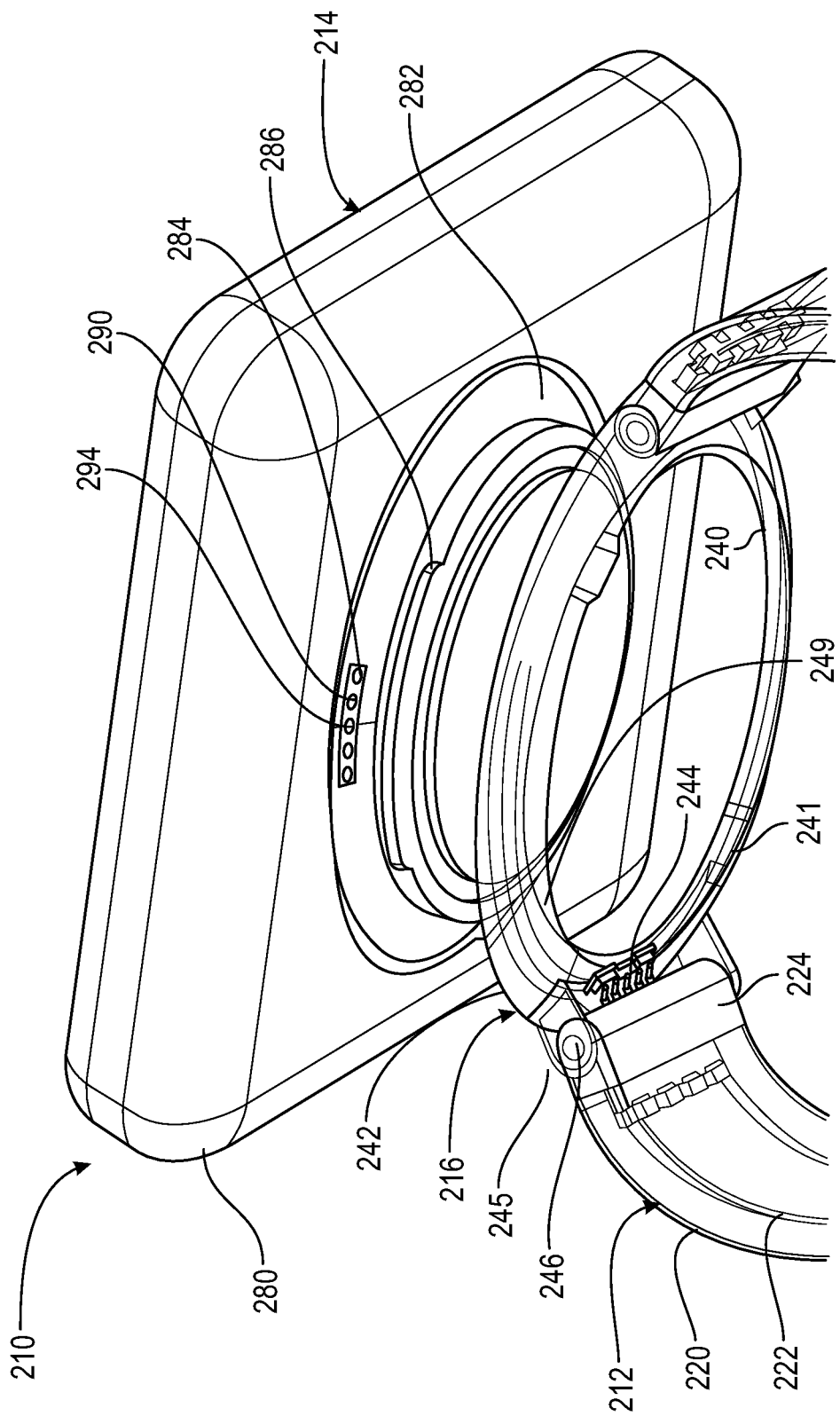
FIG. 4C is an enlarged, partially-transparent perspective view of the watch band, the receptacle, and the electronic watch of FIG. 4A, with the electronic watch shown spaced apart from the receptacle.
Figure 4D:
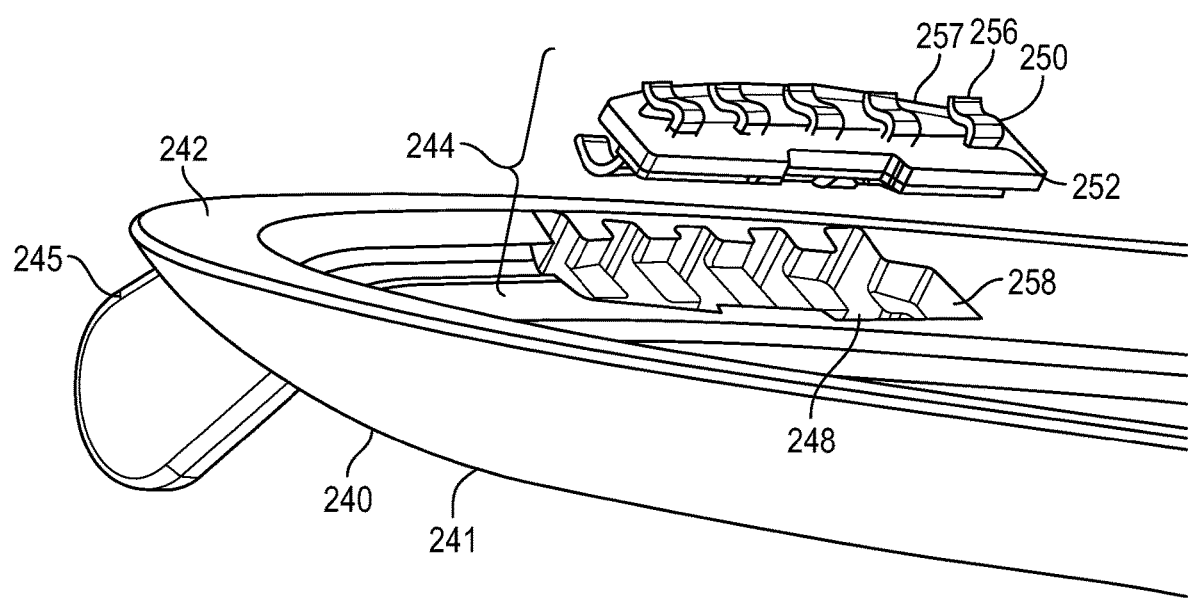
FIGS. 4D and 4E are enlarged perspective views of the connector of the receptacle of FIG. 4A.

FIGS. 4A-4H illustrate an example electronic watch system 210 that is a variation of the electronic watch system 10 of FIGS. 1A-1F, according to an aspect of the disclosure. As can be seen in FIGS. 4A and 4C, the electronic watch system 210 includes an electronic watch band 212 engaged with an electronic watch 214 through a receptacle 216 that is configured to couple the watch band with the electronic watch. The receptacle mount may include, for example, a bayonet mount or other type of mount.

The Watch Band

The electronic watch band 212 includes an enclosure 220 and a substrate 222 that are similar to the enclosure 20 and substrate 22 described above. The watch band 212 has a connector 224 disposed at each end of the enclosure 220 that is similar to the connector 24 described above, except that as can be seen in FIG. 4G, the transverse openings 228 are at an off-center circumferential position along the rounded portion of the connector 224 compared to the transverse openings 28, to accommodate the off-center location of the contacts 250 relative to the protuberances 245. Each connector 224 includes a plurality of rings 230 (FIG. 4G) disposed in the connector that are similar to the rings 30 described above. A curved portion 233 of the outer surface 236 of each ring 230 is exposed at a respective one of the plurality of transverse openings 228.

The Receptacle

The receptacle 216 may be rotationally coupled to the watch band 212 by a pin such as the pin 60 of FIG. 3C, in a manner similar to that described above with respect to the coupling between the electronic watch 214 and the watch band 212. As can be seen in FIG. 4C, the receptacle 216 includes an enclosure in the form of a circular ledge 240. The circular ledge 240 may have a bottom surface 241 and a top surface 242 opposite the bottom surface.

The receptacle 216 may include an intermediate connector 244 disposed within the circular ledge 240 at each side of the circular ledge. Each intermediate connector 244 may have, for example, one or more protuberances 245 extending from the enclosure circular ledge 240 in the second direction D2. In the example shown, each intermediate connector 244 has two protuberances 245, although in other examples, the number, size, and position of the protuberances can be varied. Each protuberance 245 may have a recess 246 extending into the protuberance in the first direction D1. The recesses 246 may be spaced apart from one another in the first direction D1. The intermediate connector 244 may have a plurality of transverse openings 248 (FIGS. 4D and 4E) extending into the intermediate connector in the second direction D2 and spaced apart from one another in the first direction D1. The transverse openings 48 may extend directly into the circular ledge 240.

Each intermediate connector 244 includes a plurality of contacts 250 disposed in the intermediate connector. As shown in the figures, there are five contacts 250, equal in number to the rings 230, but in other examples, there may be more or less than five rings. The contacts 250 may be electrically conductive, for example, a gold-plated metal or another electrically conductive material. Each contact 250 may have a middle portion 252 that is supported by the intermediate connector 244, a first end 254 that is exposed at the bottom surface 241 of the circular ledge, and a second end 256 that is exposed at the top surface 242 of the circular ledge. The first end 254 of each contact 250 may be cantilevered with respect to the middle portion 252, and the second end 256 of each contact may have a concave shape and may also be cantilevered with respect to the middle portion. Each contact 250 may be a stamped spring metal element having a shape memory, such that the contact is biased to return to its initial shape when the first end 254 or the second end 256 of the contact is bent relative to the middle portion 252 of the contact. In other examples, the contacts 250 need not have a shape memory, and the force that maintains the contact between the contacts and the rings 230 and/or the pins 290 may be provided by the circular ledge 240 or another component. In other examples, the number, size, shape, and relative position of the contacts 250 may be varied.

The first end 254 of each of the contacts 250 is exposed at the bottom surface 241 of the circular ledge 240 at a respective one of the plurality of transverse openings 248, and the second end 256 of each of the contacts is exposed at the top surface 242 of the circular ledge. Each contact 250 may be fixed to and may extend through an insulating insert 257 that is received within a corresponding recess 258 extending into the receptacle 216. The transverse openings 248 may at least partially be defined by the insulating insert 257. The insulating insert 257 may be configured to electrically insulate the contacts 250 from one another and from the circular ledge 240. The insulating insert 257 may support the middle portion 252 of each of the contacts 250, and the first end 254 and the second end 256 of each of the contacts may be cantilevered with respect to the insulating insert. In some examples, such as an example in which the material of the circular ledge 240 can electrically insulate the contacts 250 from one another, the insulating inserts 257 may be omitted.

Figure 4E:
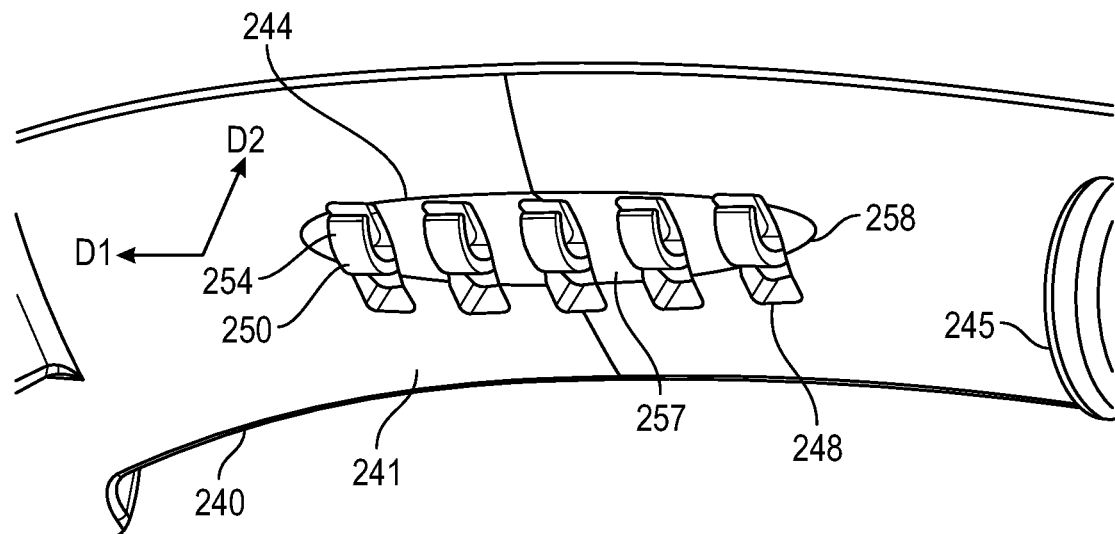
Figure 4F:
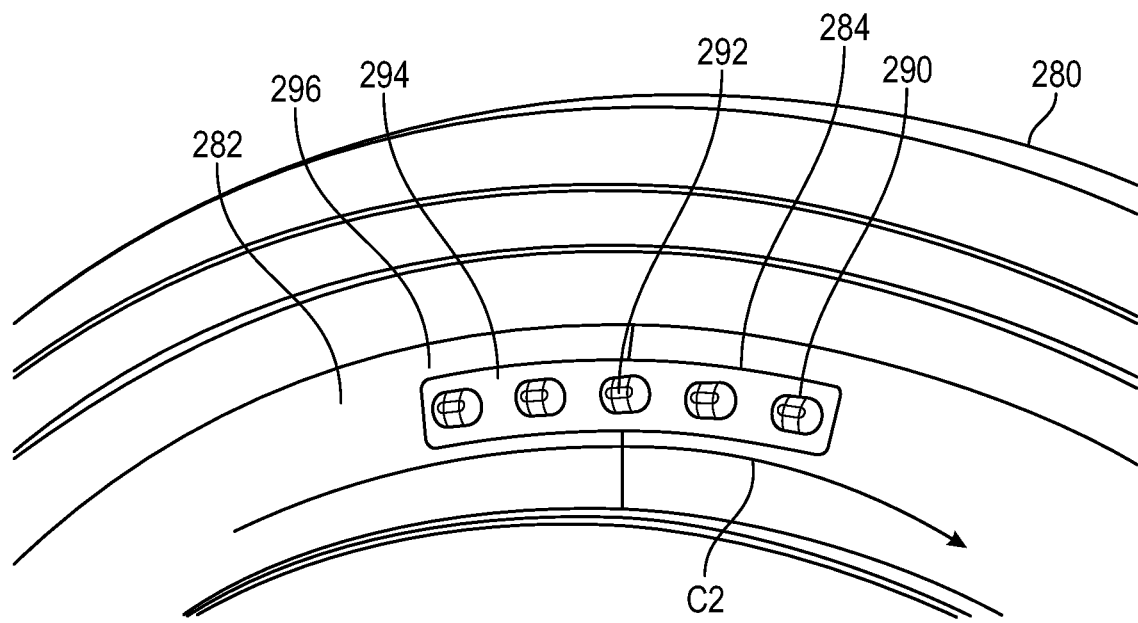
FIG. 4F is an enlarged perspective view of the connector of the electronic watch of FIG. 4A.

The contacts 250 may be spaced apart from one another. The first ends 254 of the contacts 250 may be spaced apart from one another in the first direction D1, as shown in FIG. 4E, while the second ends 256 of the contacts may be spaced apart from one another in a second circumferential direction C2, as shown in FIG. 4B. The exact shape and length of particular ones of the second ends 256 of the contacts 250 may be varied from one another in order to ensure that they are spaced apart along the second circumferential direction C2.

The Electronic Watch

Figure 4G:
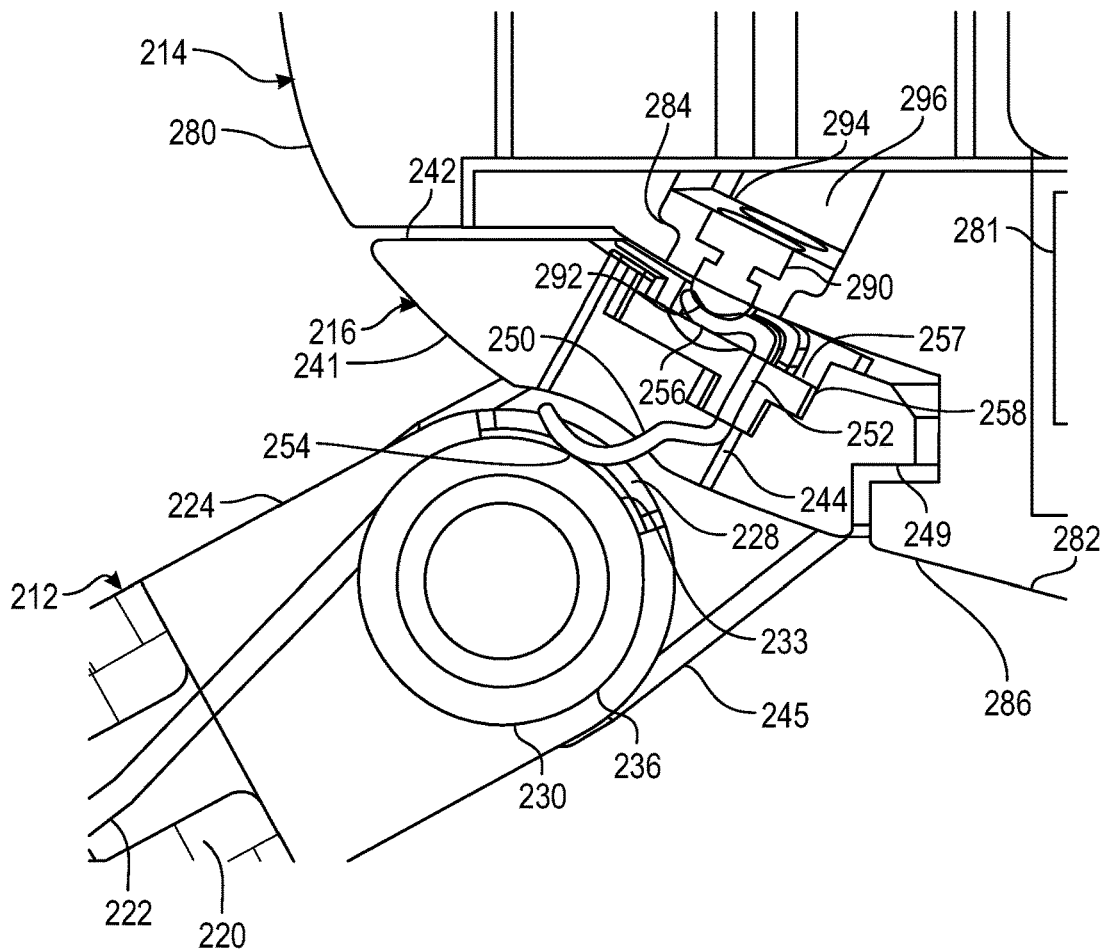
FIG. 4G is a side cross-sectional view of the coupling between the watch band, the receptacle, and the electronic watch of FIG. 4A.

The electronic watch 214 includes an enclosure 280. The electronic watch 214 may include one or more substrates extending within the enclosure 280. As can be seen in FIG. 4G, the substrates may include a PCB 281 extending within the enclosure 280. It should be understood that a different number of substrates may be used and the positions and sizes of the substrates may be varied. As shown in FIG. 4C, a bottom surface 282 of the enclosure 280 may have a circular contour that is configured to mate with the contour of the upper surface 242 of the circular ledge 240.

The electronic watch 214 may include a connector 284 disposed at each end of the bottom surface 282 of the enclosure 280. Each connector 284 includes a plurality of pins 290 disposed in the connector. The pins 290 may each be electrically conductive, for example, a gold-plated metal or another electrically conductive material. Each pin 290 may have a free end 292 exposed at a bottom surface of the second enclosure. Each of the free ends 292 of the pins 290 may have an azimuthally-elongated shape and may protrude below the bottom surface 282 of the enclosure 280. As shown in the figures, there are five pins 290, equal in number to the contacts 250 and the rings 230, but in other examples, there may be more or less than five pins. The pins 290 may be electrically connected with electrically conductive elements of the PCB 281, which may be electrically connected with one or more microelectronic devices disposed within the electronic watch 214, such as a microprocessor and memory.

The pins 290 may be spaced apart from one another in the second circumferential direction C2. As shown FIG. 4F, the pins 290 may be spaced apart from one another in the second circumferential direction C2 by equal distances, but in other examples, such as the diagrammatic example shown in FIG. 4H, the circumferential distance between adjacent pins 290 may vary within a single connector 284. The spacing of the pins 290 in the second circumferential direction C2 should be the same as the spacing of the second ends 256 of the contacts 250 in the second circumferential direction, since the pins 290 and the second ends of the contacts are configured to mate with one another when the electronic watch 214 is engaged into the receptacle 216. As can be seen in FIG. 4G, each pin 290 may be fixed to and may extend through an insulating insert 294 that is received within a corresponding recess 296 extending into the enclosure 280. The insulting insert 294 may be configured to electrically insulate the pins 290 from one another and from the enclosure 280.

Rotational Couplings

As can be seen in FIG. 4G, the electronic watch band 212 may be engaged with the electronic watch 214 through the receptacle 216, which provides an intermediate physical and electrical connection between the watch band and the electronic watch.

Coupling Between Band and Receptacle

The engagement between the electronic watch band 212 and the receptacle 216 is similar to the engagement between the electronic watch band 12 and the electronic watch 14 that is described above. To accomplish this engagement, each connector 224 is configured to mate with a corresponding intermediate connector 244, such that when the watch band 212 is engaged with the receptacle 216, each connector of the watch band is rotationally coupled with a corresponding intermediate connector of the receptacle. The rotational coupling of each connector 224 and the corresponding intermediate connector 244 may be provided by a cylindrical pin such as the pin 60 shown in FIG. 3C.

When the cylindrical pin rotationally couples each connector 224 with a corresponding intermediate connector 244, each ring 230 will touch a corresponding first end 254 of one of the contacts 250, such that when the electronic watch band 212 is engaged with receptacle 216, the rings are electrically connected with the contacts. To this end, the spacing between adjacent ones of the rings 230 should match the spacing between adjacent ones of the contacts 250, whether the spacing between adjacent rings is equal or varying.

Physical and electrical contact between one or more of the rings 230 and the contacts 250 may be maintained because of the bias of the shape memory of the contacts. The first end 254 of one or more of the contacts 250 extends completely through the respective transverse opening 248 and slightly beyond the bottom surface 241 of the circular ledge 240, such that when the electronic watch band 212 is engaged with the receptacle 216, the first ends of the contacts extend into the transverse openings 228 of the connector 224, and there is interference between the first ends of the contacts and the rings 230. When each ring 230 contacts a first end 254 of a contact 250, the cantilevered first end moves relative to the middle portion 252 that is supported by the circular ledge 240. Since each first end 254 is biased to return to its initial shape when it is bent relative to the middle portion 252, the shape memory of the contact 250 provides a force against the corresponding ring 230 that maintains physical and electrical contact between the contact and the ring.

Coupling Between Watch and Receptacle

The engagement between the electronic watch 214 and the receptacle 216 is accomplished by translating the electronic watch into the receptacle until the bottom surface 282 of the enclosure 280 engages into the circular ledge 240 in a first engaged position, in which the pins 290 are spaced apart from the contacts 250 in the second circumferential direction C2, and then rotating the electronic watch relative to the receptacle until the electronic watch and the receptacle are in a second engaged position, in which until all of the pins are aligned with respective ones of the contacts in the second circumferential direction.

Once the electronic watch 214 and the receptacle 216 are in the second engaged position, the pins 290 will be physically engaged and electrically connected with the contacts 250, and engagement between a tab 286 extending from the bottom surface 282 of the enclosure 280 and a tab 249 extending from the bottom surface 241 of the circular ledge 240 will prevent separation of the electronic watch from the receptacle due to translation of the watch. To this end, the spacing between adjacent ones of the pins 290 should match the spacing between adjacent ones of the contacts 250, whether the spacing between adjacent pins is equal or varying, as will be described in more detail below.

The structure of the free ends 292 of the pins 290 and the second ends 256 of the contacts 250 are configured to prevent separation of the electronic watch 214 from the receptacle 216 due to rotation of the electronic watch, unless a sufficient rotational force is provided. Physical and electrical contact between the pins 290 and the contacts 250 may be maintained because of the bias of the shape memory of the contacts and the complimentary shapes of the pins and the contacts. Before engagement between the electronic watch 214 and the receptacle 216, the second end 256 of each of the contacts 250 extends slightly above the top surface 242 of the circular ledge 240. When the electronic watch 214 is engaged with the receptacle 216, the azimuthally-elongated free end 292 of each of the pins 290 extends into a concave portion of the second ends 256 of the contacts 250, and there is interference between the second ends of the contacts and the pins.

When each pin 290 contacts a second end 256 of a contact 250, the cantilevered second end moves relative to the middle portion 252 that is supported by the circular ledge 240, such that the second end deflects into the intermediate connector 244. Since each second end 256 is biased to return to its initial shape when it is bent relative to the middle portion 252, the shape memory of the contact 250 provides a force against the corresponding pin 290 that maintains physical and electrical contact between the contact and the pin. This force between the pins 290 and the contacts 250 is configured to prevent separation of the electronic watch 214 from the receptacle 216 due to rotation of the electronic watch, unless a rotational force is provided that is sufficient to overcome the force and interference between the pins and the contacts.

Contact and Pin Locations of Watch and Receptacle

Figure 4H:
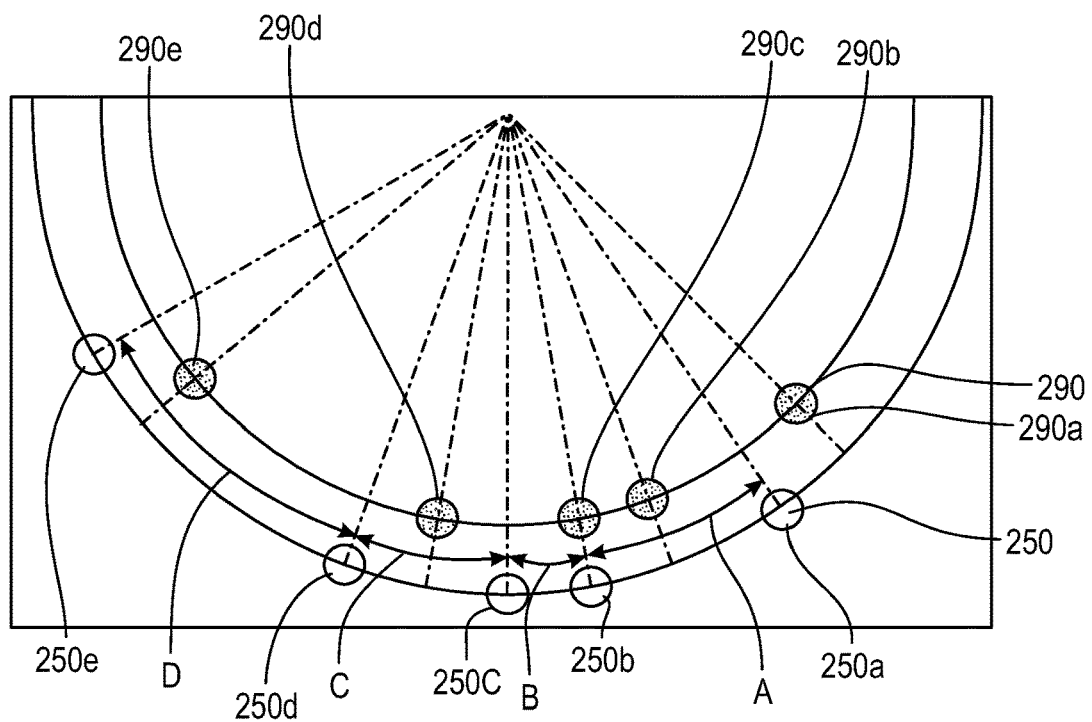
FIG. 4H is a diagrammatic view of the coupling between the contacts of the receptacle and the electronic watch of FIG. 4A, shown with only one pair of contacts rotationally aligned with one another.

While the electronic watch 214 is being rotated relative to the receptacle 216 from the first engaged position towards the second engaged position, in order to prevent a short circuit from occurring, it is desirable that there be only a single physical and electrical connection between any of the pins 290 and any of the contacts 250 during any single moment in time before the second engaged position is reached. This can be accomplished by unevenly spacing the second ends 256 of the contacts 250 apart from one another and applying the same uneven spacing to the pins 290 in the second circumferential direction C2, according to a specific set of rules. One example of such a spacing is shown in FIG. 4H, where at the intermediate position shown (between the first engaged position and the second engaged position), the only physical and electrical connection between any of the pins 290 and any of the contacts 250 is between the third pin 290c and the second contact 250b.

The specific set of rules that can accomplish the desired uneven spacing described above can be expressed by relationships between first, second, third, fourth, and fifth contacts 250a, 250b, 250c, 250d, and 250e, and the angular distances between adjacent ones of the contacts, which are A, B, C, and D. If A is not equal to B+C, and B is not equal to C+D, and D is not equal to B+C, then it can be mathematically guaranteed that there will be only a single physical and electrical connection between any of the pins 290 and any of the contacts 250 during any single moment in time before the second engaged position is reached. In the particular example shown in FIG. 4H, A=25°, B=10°, C=20°, and D=40°, so the above equations are satisfied, and the desirable short-circuit-preventing condition will be achieved.

Other Variations

Although the above example systems all include rotational couplings involving an electronic watch and an electronic watch band, the above-described rotatable electrical ring-contact coupling may be implemented in a variety of rotational coupling examples.

Figure 5:
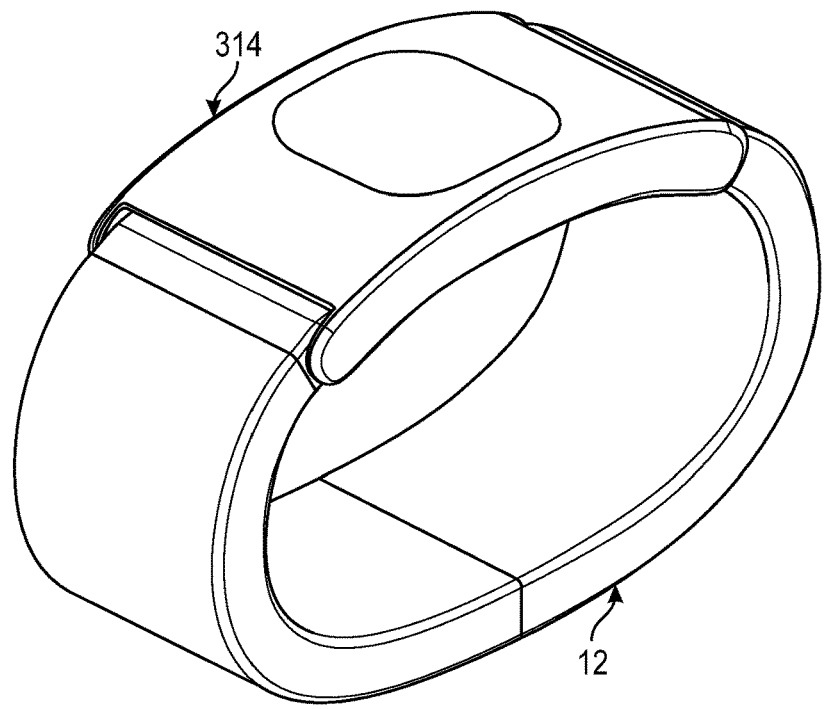
FIG. 5 illustrates a perspective view of an activity module system according to an aspect of the disclosure.

For example, FIG. 5 shows an example electronic activity module system 300, where the electronic watch band 12 may be coupled to an electronic activity module 314, which does not have an integrated display screen. The electronic activity module 314 can be a smart medical module such as an EKG module. The electronic watch band 12 can provide the electronic activity module 314 with extra battery capacity and/or wireless communication between the watch band and a smartphone. In such an activity module system 300, the smartphone can serve as the display and interface for a user to communicate with the electronic activity module 314.

Figure 6:
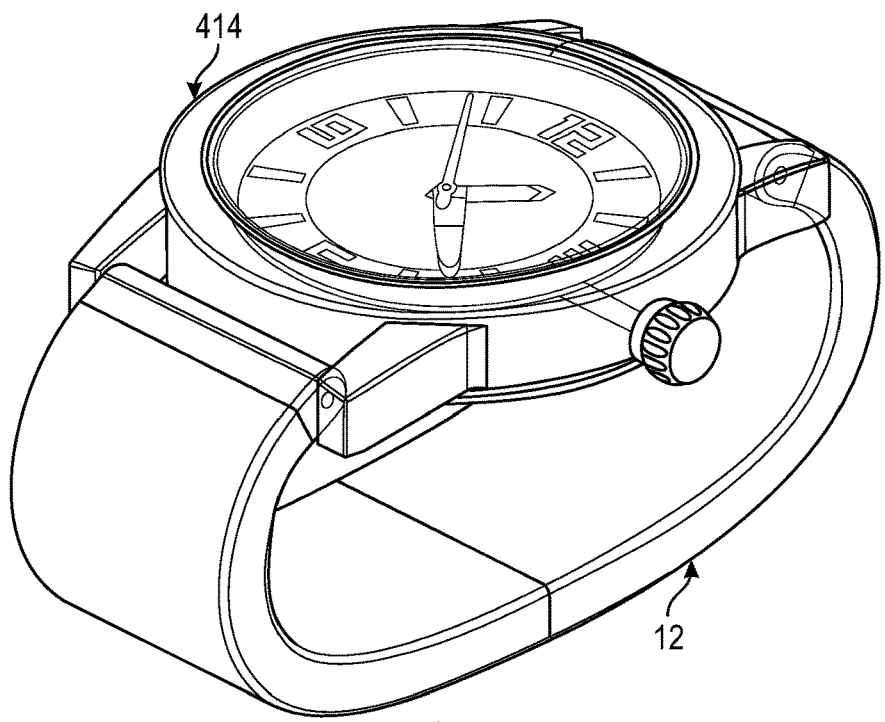
FIG. 6 illustrates a perspective view of an analog watch system according to an aspect of the disclosure.

FIG. 6 shows an example electronic analog watch system 400, where the electronic watch band 12 may be coupled to an analog watch 414, which may not have an integrated display screen or integrated smartwatch features. The electronic analog watch system 400 may allow a user to wear a stylish and/or high-value analog watch, while the electronic watch band 12 may enable smartwatch features. The electronic watch band 12 may provide the analog watch 414 with activity-specific features, such as medical features, sports features, payment features, and the like. The electronic watch band 12 may be able to wirelessly communicate with a smartphone. In such an electronic analog watch system 400, the smartphone can serve as the display and interface for a user to communicate with the electronic watch band 12 to monitor and/or control the activity-specific features of the watch band.

Figure 7:
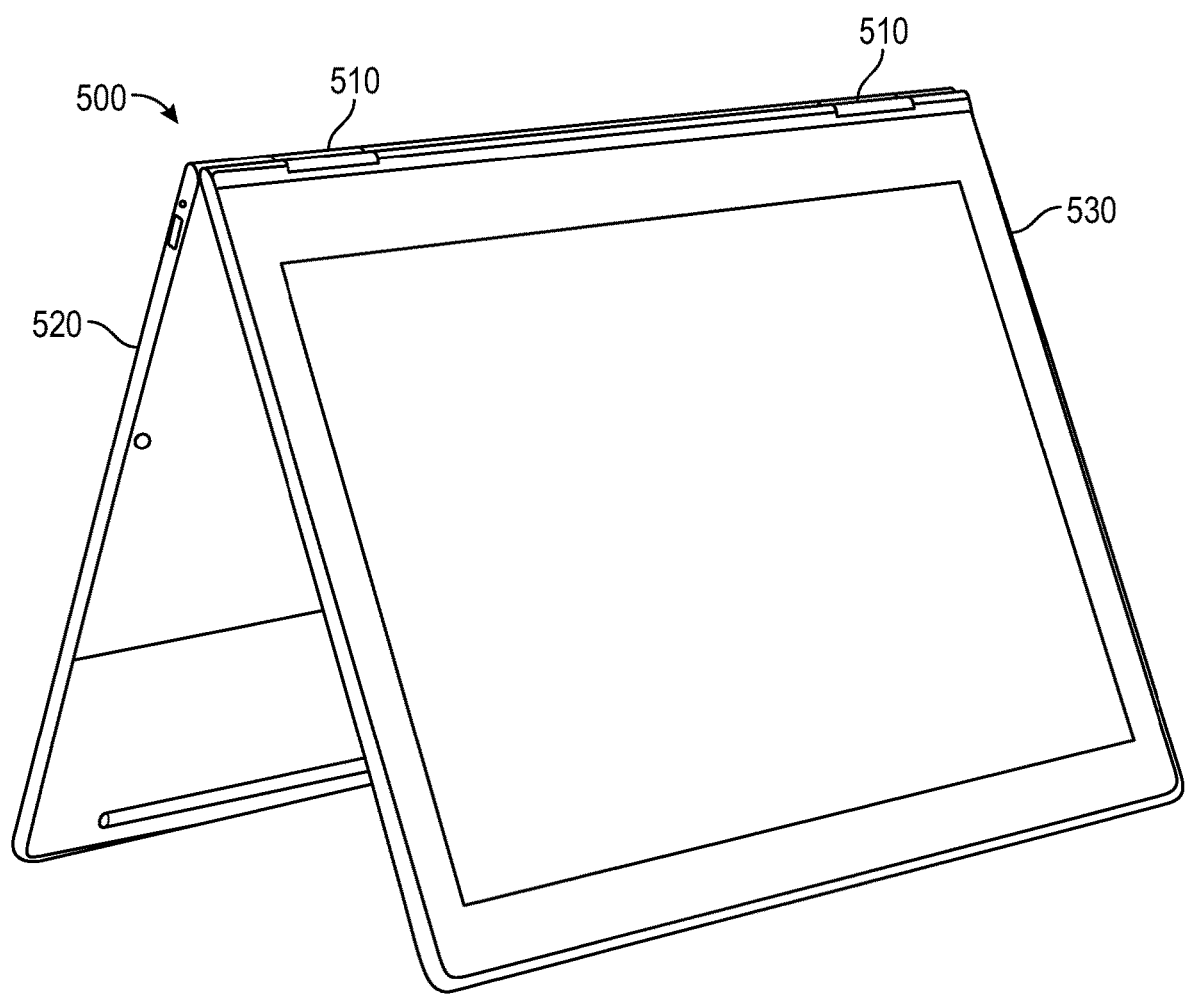
FIG. 7 illustrates a perspective view of a laptop hinge system according to an aspect of the disclosure.

FIG. 7 shows an example laptop system 500, in which the above-described rotatable electrical ring-contact coupling may be implemented in an electronic hinge 510 that rotatably couples a computer keyboard 520 with a display screen 530. Such a laptop system 500 can permit electronic signals to pass through the rotating electronic hinge 510 while permitting the computer keyboard 520 to be selectively attached and detached from the display screen 530.

For example, the laptop system 500 may have one or more electronic hinges 510 that each include a corresponding one of the connectors 44 (FIG. 1D) attached to the computer keyboard 520 and a corresponding one of the connectors 24 (FIG. 1B) attached to the display screen 530. The laptop system 500 may include a toggle configured to extend or retract one or more elements such as the pin 60 shown in FIG. 3C or portions thereof that may provide the coupling between pairs of the connectors 44 and 24. When such pins 60 or portions thereof are retracted, the computer keyboard 520 and the display screen 530 may be separated from one another, and when such pins or portions thereof are extended, the computer keyboard and the display screen may be rejoined to one another.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing

The invention claimed is:

1. An electronic hinge system, comprising:
a first component including:
a first enclosure housing electrically conductive elements, and
a first connector disposed at an end of the first enclosure; and
a second component including:
a second enclosure, and
a second connector disposed at an end of the second enclosure,
wherein the first connector is configured to mate with the second connector, such that when the first component is engaged with the second component, the first connector is in a rotational electrically conductive connection with the second connector, and
wherein the second connector is further configured to mate with a third connector, such that when the second connector is engaged with the third connector, the second connector is in an electrically conductive connection with the third connector.

2. The electronic hinge system of claim 1, wherein the second enclosure houses a plurality of second electrically conductive elements, and wherein the first connector and second connector, when mated, form an electrical connection between the electrically conductive elements in the first enclosure and the second electrically conductive elements in the second enclosure.

3. The electronic hinge system of claim 2, wherein the first component is an electronic watch band and the second component is an electronic watch.

4. The electronic hinge system of claim 1, wherein the first connector comprises:
a longitudinal opening extending in a first direction through the first connector; and
a plurality of first openings extending into the first connector in a second direction transverse to the first direction and spaced apart from one another in the first direction.

5. The electronic hinge system of claim 4, wherein the second connector includes two recesses each extending into the second connector, the two recesses spaced apart from one another in the first direction, the electronic hinge system further comprising a pin extending in the first direction through the longitudinal opening and into each of the recesses, the pin rotationally coupling the first component with the second component.

6. The electronic hinge system of claim 4, wherein the first connector further comprises a plurality of curved elements disposed in the first connector, the plurality of curved elements being electrically conductive and spaced apart from one another in the first direction, each curved element being electrically connected with at least a respective one of the electrically conductive elements of the first component.

7. The electronic hinge system of claim 4,
wherein the second connector comprises a plurality of second openings extending into the second connector in a third direction transverse to the first direction and spaced apart from one another in the first direction, and the second connector has a plurality of contacts disposed therein, the plurality of contacts being electrically conductive and spaced apart from one another in the first direction, a portion of at least some of the contacts each exposed at a respective one of the plurality of second openings, each contact being electrically connected with at least a respective one of the second electrically conductive elements of the second component, and
wherein the first connector further comprises a plurality of curved elements is configured to mate with the plurality of contacts, such that when the first component is engaged with the second component, the plurality of curved elements are electrically connected with the plurality of contacts.

8. The electronic hinge system of claim 1, wherein the first connector and the second connector have interlocking features that are configured to mate with one another when the first component is engaged with the second component, the interlocking features being configured to prevent rotation of the first connector and the second connector relative to one another.

9. The electronic hinge system of claim 1, further comprising a gasket configured to provide a water-tight seal around an interface between the first component and the second component.

10. An electronic watch system, comprising:
a watch housing having circuitry within the watch housing, the circuitry including a plurality of electrically conductive elements; and
a watch connector disposed adjacent a surface of the watch housing, the watch connector comprising a plurality of pins, the plurality of pins being electrically conductive and spaced apart from one another, each pin having an exposed end configured to engage, in a rotational electrically conductive connection, with a receptacle of a watch band connector having a plurality of contacts, each pin being electrically connected with at least a respective one of the electrically conductive elements,
wherein the plurality of pins is configured to mate with the plurality of contacts of the receptacle, such that when the watch connector is engaged with the receptacle, free ends of the pins are engaged with and electrically connected with the contacts, and
wherein the receptacle is configured to be rotationally engaged with the watch connector such that, when engaged, an electrical connection is formed between the plurality of electrically conductive elements in the watch housing and the watch band connector and maintained during rotation of the watch band connector relative to the receptacle.

11. The electronic watch system of claim 10, wherein each of the pins has an azimuthally-elongated shape and protrudes from a bottom surface of the watch housing.

12. The electronic watch system of claim 10, wherein the pins are unevenly spaced apart from one another.

13. The electronic watch system of claim 10, wherein during engagement of the electronic watch with the receptacle there is a single electrical connection between the pins and contacts at any time before a fully engaged position is reached.

14. An electronic watch band, comprising:
a flexible enclosure encasing electrically conductive elements; and a connector disposed at an end of the first enclosure and having a plurality of curved elements disposed in the connector, the plurality of curved elements being electrically conductive and spaced apart from one another, each curved element being electrically connected with at least a respective one of the electrically conductive elements in the flexible enclosure; and a receptacle rotationally coupled with the flexible enclosure and configured to mate with both the flexible enclosure and a watch housing.

15. The electronic watch band of claim 14, the receptacle further comprising an intermediate connector having a plurality of contacts disposed therein, the plurality of contacts being electrically conductive and spaced apart from one another in a circumferential direction, each contact having a first end, the first ends of the contacts engaged with and electrically connected with the plurality of curved elements.

16. The electronic watch band of claim 15, the receptacle further comprising a circular ledge, wherein the intermediate connector is disposed within the circular ledge.

17. The electronic watch band of claim 16, wherein a first end of each contact is exposed at a bottom surface of the circular ledge and a second end of each contact is exposed at a top surface of the circular ledge opposite the bottom surface.

* * * * *